(12) United States Patent
Tan

(10) Patent No.: US 9,188,482 B2
(45) Date of Patent: Nov. 17, 2015

(54) OPTICAL SENSOR WITH SPECIAL DISCRIMINATION

(71) Applicant: Avago Technologies General IP (Singapore) Pte. Ltd., Singapore (SG)

(72) Inventor: Boon Keat Tan, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 273 days.

(21) Appl. No.: 13/865,606

(22) Filed: Apr. 18, 2013

(65) Prior Publication Data

US 2014/0312234 A1    Oct. 23, 2014

(51) Int. Cl.
*G01J 1/42* (2006.01)
*G01J 1/04* (2006.01)

(52) U.S. Cl.
CPC ............ *G01J 1/4228* (2013.01); *G01J 1/0418* (2013.01); *G01J 1/4204* (2013.01)

(58) Field of Classification Search
CPC ...... G01J 1/4228; G01J 1/4204; G01J 1/0418
See application file for complete search history.

(56) References Cited

U.S. PATENT DOCUMENTS

| 5,965,875 | A | 10/1999 | Merrill |
| 8,274,051 | B1 | 9/2012 | Aswell et al. |
| 2008/0158548 | A1* | 7/2008 | Chen et al. ................. 356/73 |
| 2008/0191298 | A1 | 8/2008 | Lin et al. |
| 2009/0160830 | A1* | 6/2009 | Omi et al. ................. 345/204 |
| 2010/0252871 | A1 | 10/2010 | Kalnitsky et al. |
| 2010/0282953 | A1 | 11/2010 | Tam |

OTHER PUBLICATIONS

"Low Power Ambient Light and Proximity Sensor With Enhanced Infrared Rejection", <http://www.intersil.com/en/products/optoelectronics/ambient-light-and-proximity-sensors/light-to-digital-sensors/ISD29038.html> Downloaded Apr. 18, 2013.

* cited by examiner

*Primary Examiner* — Mark R Gaworecki

(57) ABSTRACT

In one embodiment, an ambient light sensor with first and second photo-detectors is disclosed. The first and second photo-detectors may have different depths and respond differently to light having a specific wavelength. The ambient lights sensor may further comprise a circuit configured to detect light of a specific wavelength. In another embodiment, the first and second photo-detectors may be configured such that each of the first and second photo-detectors detects coupling current from each other. In yet another embodiment, in addition to the first and second photo-detectors, a third photo-detector may be formed proximate to at least one of the first and second photo-detectors such that coupling photo-current is detected therein by the at least one of the first and second photo-detectors.

20 Claims, 17 Drawing Sheets

US 9,188,482 B2

OPTICAL SENSOR WITH SPECIAL DISCRIMINATION

BACKGROUND

Ambient light sensors may be widely used in many electronic appliances. For example, most LCD TVs ("Liquid Crystal Display televisions") may utilize ambient light sensors to control the LCD ("Liquid Crystal Display") screens according to the ambient environment. In addition, ambient light sensors may be widely used in portable devices. For similar reasons explained above, LCD screens for portables devices such as mobile phones, portable computers and tablets may also rely on ambient light sensors for automatic brightness control targeted to reduce power consumption. Another popular application for ambient light sensors may be cameras. Most cameras perform image processing on the images taken in accordance to ambient light.

One major component of ambient light sensors for detecting light may be photo-detectors. However, photo-detectors can only detect light intensity but cannot detect wavelength. This may be due to the reason that different light sources may produce similar brightness. Interposing various optical filters on ambient light sensors may enable wavelength detection to some extent. For example, by using several photo-detectors each covered by different filters such a red, green blue, cyan, magenta, yellow, and infrared filters, light of having such wavelengths may be detected by the respective photo-detectors.

However, different light sources may produce light having different wavelength components. If a special discrimination technique is available to detect the wavelength components of the ambient light, light sources may be identified more accurately. Therefore, a cost effective wavelength discrimination technique may be desirable for ambient light sensing. However, such technique may not only be used in ambient light sensors, but also other optical sensors such as camera chips, fiber optic sensors or some other applications that may need to identify wavelength of the source.

BRIEF DESCRIPTION OF THE DRAWINGS

Illustrative embodiments by way of examples, not by way of limitation, are illustrated in the drawings. Throughout the description and drawings, similar reference numbers may be used to identify similar elements. The drawings are for illustrative purpose to assist understanding and may not be drawn per actual scale.

DETAILED DESCRIPTION

Figure 1A:
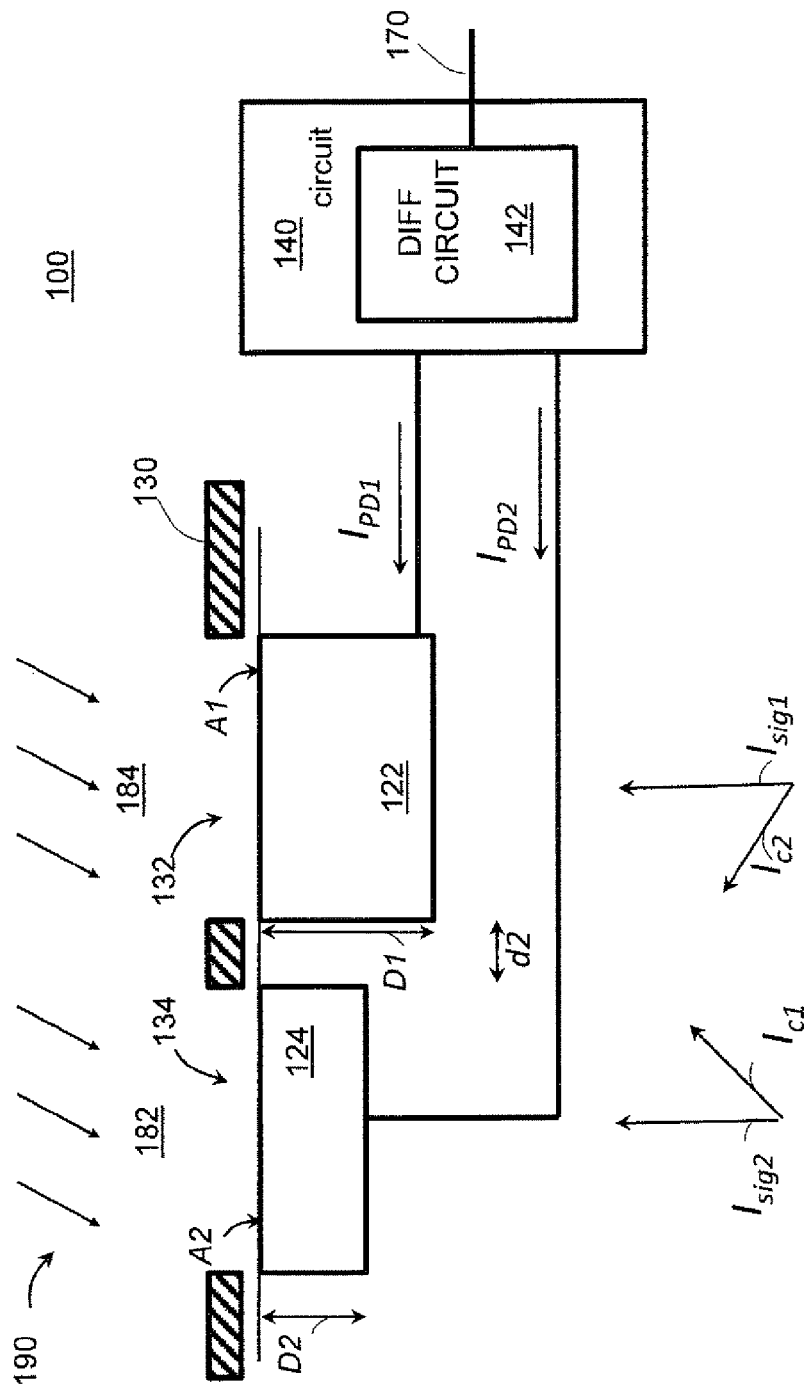
FIG. 1A shows a block diagram of an ambient light sensor having a photo-detector pair.

FIG. 1A shows a block diagram of an ambient light sensor. The ambient light sensor 100 may be configured to sense incident light 190. The ambient light sensor 100 may comprise a first photo-detector 122, a second photo-detector 124 and a circuit 140. Both the first and second photo-detectors 122, 124 may be exposed to the incident light 190. The first and second photo-detectors 122, 124 may be a photo-diode, a photo-transistor or any other photo-sensors that may be configured to detect light or to transform light into other form of energy such as electric. For example, the first photo-detector 122 may be configured to generate a first photo-current, $I_{PD1}$ whereas the second photo-detector 124 may be configured to generate a second photo-current, $I_{PD2}$.

The first and second photo-detectors 122, 124 may be unshielded for the purpose of wavelength detection. Specifically, the first and second photo-detectors 122, 124 may not be covered by metal layers or semi-transparent gate oxide layers that may attenuate light. More specifically, the first and second photo-detectors 122, 124 may be covered with substantially transparent material such that the light emitted towards the first and second photo-detectors 122, 124 may be substantially un-attenuated. However, the first and second photo-detectors 122, 124 may not be unshielded when the first and second photo-detectors 122, 124 have more than one function. For example, both the first and second photo-detectors 122, 124 may be configured to detect intensity of ambient light but simultaneously, the first and second photo-detectors 122, 124 may be configured to detect portions of infrared light in the ambient light detected.

In another embodiment, the first and second photo-detectors 122, 124 may be covered by color members for image capture purposes or for color sensing purposes, but simultaneously, the first and second photo-detectors 122, 124 may be configured to detect types of light sources (not shown) that produce the ambient light 190. In yet another embodiment, the first and second photo-detectors 122, 124 may be covered by optical filters (not shown). Optical filters may be optical materials that selectively transmit light in a particular range of wavelengths, that is, colors, while blocking or attenuating the remainder. Optical filters may be band-pass filter that may pass a band of wavelengths, but blocking both longer and shorter wavelengths. Examples of such band-pass filter may be pigment color filters. In addition, some optical filter may attenuate light above or below a specific wavelength, such as ultra violet light filter and infrared filter. There are some optical filters with more complex transmission characteristic. Optical filters may be interference filter optical filters or pigment color filters.

For wavelength detection purpose, the optical filter (not shown) above both the first and second photo-detectors 122, 124 may be substantially similar. The more the first and second photo-detectors 122, 124 being spaced apart, the higher the thickness variation between the optical filters (not shown) formed on the first and second photo-detectors 122, 124. Therefore, in the embodiment where the first and second photo-detectors 122, 124 are covered by color filters, the first and second photo-detectors 122, 124 may be spaced apart by a distance less than 10 um.

The ambient light sensor 100 may further comprise a metal layer 130 having first and second apertures 132,134 exposing the first and second photo-detectors 122, 124 to the incident light 190. The metal layer 130 may be optional. However, having the metal layer 130 may enable generation of photo-currents $I_{PD2}$, $I_{PD2}$ in a more controllable manner. For example, without the metal layer 130, the incident light may be received everywhere below the first and second photo-detectors 122, 124, causing calculation or estimation of photo-currents $I_{PD1}$, $I_{PD2}$ in the first and second photo-detectors 122, 124 to be more complicated.

Figure 1B:
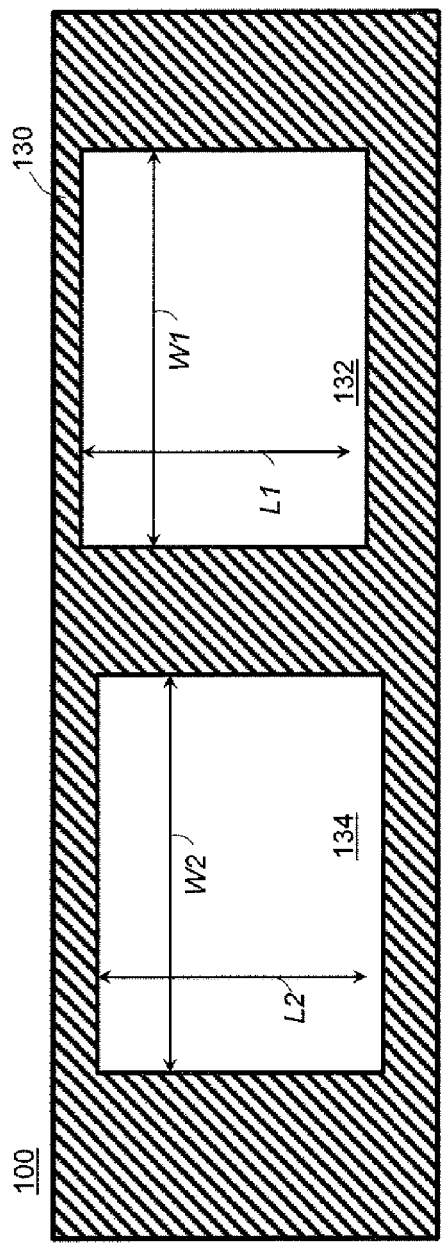
FIG. 1B illustrates a top view of the ambient light sensor shown in FIG. 1A.

As shown in FIG. 1B, the first aperture 132 defined by the metal layer 130 may have a first width dimension W1 and a first length dimension L1, whereas the second aperture 134 defined by the metal layer 130 may have a second width dimension W2 and a second length dimension L2. For the first and second photo-detectors 122, 124 to receive similar amount of the incident light 190, the first width dimension W1 may be substantially similar to the second width dimension W2, whereas the first length dimension L1 may be substantially similar to the second length dimension L2.

Referring to FIG. 1A, the first photo-detector 122 may comprise a first surface A1 for receiving the incident light 190, and a first depth D1 measuring substantially perpendicularly from the first surface A1. Similarly, the second photo-detector 124 may comprise a second surface A2 for receiving the incident light 190, and a second depth D2 measuring substantially perpendicularly from the first surface A2. The first surface A1 and the second surface A2 may have form factors similar to those of the apertures 132 and 134 respectively. For example the first surface A1 may have width and length dimensions similar to the first width dimension W1 and the first length dimension L1 of the first aperture 132 whereas the second surface A2 may have width and length dimensions similar to the second width dimension W2 and the first length dimension L2 of the second aperture 134. This arrangement may ensure similar amount and portions of the incident light 190 to be received in both the first and second photo-detectors 122, 124.

In another embodiment, the first surface A1 may have width and length dimensions (not shown) relatively larger than the first width dimension W1 and the first length dimension L1 of the first aperture 132 respectively, whereas the second surface A2 may have width and length dimensions (not shown) relatively larger than the second width dimension W2 and the first length dimension L2 of the second aperture 134 respectively. However, in order to be cost effective, the width and length dimensions of the first and second surfaces A1, A2 may be less than Sum larger than the respective dimensions of the first and second apertures 132, 134. The fact that the first and second detectors 122, 124 having a larger size may be advantageous because photo-currents $I_{PD1}$, $I_{PD2}$ generated in the first and second photo-detectors 122, 124 may be more dependent on the areas of the first and second photo-detectors 122, 124. Hence, the photo-currents $I_{PD1}$, $I_{PD2}$ generated may be more predictable.

Figure 1C:
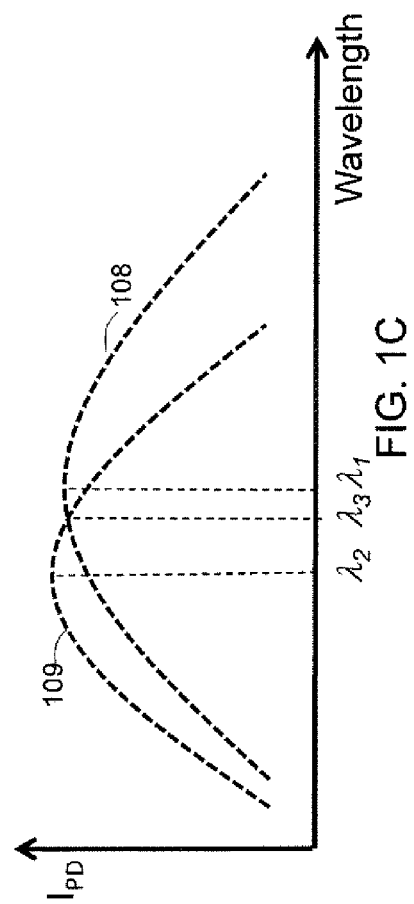
FIG. 1C illustrates spectral responses of the photo-detectors shown in FIG. 1A.

The first depth D1 may be relatively deeper than the second depth D2 dimension such that the first and second photo-detectors 122, 124 respond differently to the incident light 190. This is illustrated using the spectral response graphs 108, 109 of the first and second photo-detectors 122, 124 shown in FIG. 1C. The Y-axis of the graphs 108, 109 represents the photo-currents $I_{PD1}$, $I_{PD2}$ detected in each of the first and second photo-detectors 122, 124, plotted against the X-axis representing the wavelength of the incident light 190. As shown in FIG. 1C, the first photo-detector 122 may be more responsive to light of a first predetermined wavelength $\lambda_1$ whereas the second photo-detector 124 may be more responsive to a second predetermined wavelength $\lambda_2$. Both the first and second photo-detectors 122, 124 may yield substantially similar photo-currents where the graphs 108, 109 crosses each other when the incident light 190 has wavelength of a third predetermined wavelength $\lambda_3$.

The incident light 190 having wavelength components of infrared may not be visible. In one embodiment customized to detect visible light, the first and second depths D1, D2 may be selected such that the first photo-detector 122 yields a spectral response graph 108 having a peak response at the first predetermined wavelength $\lambda_1$ located approximately in infra-red region. Similarly, the second photo-detector 124 may yield a graph 109 having a peak response at the second predetermined wavelength $\lambda_2$ located approximately in the green visible light region and that the third predetermined wavelength $\lambda_3$ where the two graphs 108, 109 cross each other to be substantially close to the first predetermined wavelength $\lambda_1$.

Referring to FIG. 1A, the second photo-detector 124 may be formed proximate to but distanced away the first photo-detector 122 such that the first and second photo-detectors 122, 124 receive substantially similar portions of the incident light 190. In addition, the first and second photo-detectors 122, 124 may be formed proximate to but distanced away from each other such that coupling photo-currents may be detected. For example, the second photo-detector 124 may be formed proximate to but distanced away from the first photo-detector 122 such that the first photo-detector 122 causes a substantial coupling photo-signal $I_{c2}$ in the second photo-detector 124 when the incident light 190 falls on the first photo-detector 122.

In other words, as shown in the embodiment illustrated in FIG. 1A, photons received in the first photo-detector 122 may not only cause a photo-signal $I_{sig1}$ to be collected and detected in the first photo-detector 122, but may also cause a coupling photo-signal $I_{c2}$ to be detected in the neighboring second photo-detector 124. Similarly, photons received in the second photo-detector 124 may not only cause a photo-signal $I_{sig2}$ to be collected and detected in the second photo-detector 124, but may also cause a coupling photo-signal $I_{C1}$ to be detected in the neighboring first photo-detector 122.

In the embodiment shown in FIG. 1A, the first and second photo-detectors 122, 124 of the ambient light sensor 100 may be spaced apart by a distance d2. The distance d2 may be technology dependent and may depend on the ability of free carrier, either electron or hole may travel before recombination after being generated or excited by photons. In one embodiment, the distance d2 may be less than 50 um because in most technologies, coupling photo-signals $I_{C1}$, $I_{c2}$ from neighboring photo-detectors 122, 124 being spaced apart more than 50 um may be approximately close to zero. The distance d2 may be selected to be less than 25 um for most semiconductor fabrication technologies. The distance d2 of 25 um may be advantageous because the separation distance d2 of 25 um may be sufficient to yield substantive coupling photo-signals $I_{C1}$, $I_{C2}$ caused to be detected in neighboring the neighboring photo-detectors 122, 124, and yet cost effective enough as this separation does not taking up too much die size.

The first and second photo-detectors 122, 124 may be unshielded such that the first and second photo-detectors 122, 124 are substantially exposed to the incident light 190. For example, the ambient light sensor 100 may be substantially fully exposed to light by having substantially transparent materials 182, 184 such as passivation layers made from silicon dioxide or other similar materials covering the first and second photo-detectors 122, 124. With substantially transparent material, light loss during the process of transmitting through the materials 182, 184 covering the first and second photo-detectors 122, 124 may be less than approximately 5%. Thus, unshielded first and second photo-detectors pairs 122, 124 may be more efficient compared to photo-detectors (not shown) that may be shielded.

For example, in another embodiment where the first and second photo-detectors 122, 124 are used for image capture or color sensing other than detecting wavelength, the first and second photo-detectors 122, 124 may be both covered by similar optical filter materials such as pigment color filters (not shown) where more light loss, for example, between 10% and 50% may occur. The pigment color filters (not shown) may be for other functionality such as image capture or color sensing of the first and second photo-detectors 122, 124 that may not be related to wavelength discrimination. However, both materials 182 and 184 covering the respective first and second photo-detectors 122, 124 may be made substantially similar so that portions and amount of the incident light 190 received in the first and second photo-detectors 122, 124 are substantially similar.

Comparing the photo-detectors 122, 124 covered with similar optical filter (not shown), the embodiment with unshielded photo-detectors 122, 124 may be superior in terms of cost effectiveness and precision of wavelength detection. Unavoidably, addition of color filters or any other optical filter may invoke additional cost and/or inefficiency from use of additional undesirable manufacturing process materials and/or steps. The additional cost and/or inefficiency may be somewhat offset by additional functions provided by the optical filter (not shown). However, in applications where manufacturing efficiency and/or precision of wavelength detection may matter, unshielded photo-detectors 122, 124 may be substantially superior. The addition of optical filters may unavoidably add errors to the precision of wavelength detection because of process variation of the optical filter (not shown) fabrication.

The circuit 140 may be formed integrally with the first and second photo-detectors 122, 124 in a single monolithic semiconductor die (not shown). However, the circuit 140 may be formed in a different semiconductor die (not shown) using a different process technology but being electrically coupled to the first and second photo-detectors 122, 124. The circuit 140 may be electrically coupled to the first and photo-detectors 122, 124 configured to determine an indication of spectral content of the incident light 190. An indication of spectral contents may comprise determining wavelength of the light incident on the first and second photo-detectors 122, 124, intensity of light in each wavelength components, and any other indications that may lead to determination of the spectral contents of the incident light 190, that in turns may contribute towards identification of the light source used to produce the incident light 190.

The ambient light sensor 100 may comprises a differential amplifier 142 for computing a signal indicative of the difference between the first photo-current $I_{PD1}$ and the second photo-current $I_{PD2}$. As explained in FIG. 1C, the difference between the first and photo-current $I_{PD1}$ and the second photo-current $I_{PD2}$ may be indicative of the spectral content of the incident light 190. However, a more precise and practical method may be to normalize the differential signal, therefore, the circuit 140 may be configured to generate an output 170 indicative of a ratio of the difference between the first and second photo currents $I_{PD1}$, $I_{PD2}$ to one of the first and second photo-currents $I_{PD1}$, $I_{PD2}$ as shown in Equation (1). The ratio may provide the indication of the spectral content of the incident light 190. For ambient light sensors 100, the ratio may be utilized to identify light sources that produce the ambient light. In some application, the ratio may be computed further to identify amount of infrared light existed in the ambient light for controlling and adjusting LCD screens.

$$(I_{PD1}-I_{PD1})/I_{PD1} \ldots \text{or} (I_{PD1}-I_{PD1})/I_{PD2} \qquad (1)$$

By using equation (1) and with relevant parameters such as the first and second depths D1, D2 and the distance d2 selected accordingly, the first and second photo-detectors 122, 124 may be configured to detect any predetermined wavelength. In other words, wavelength detection or wavelength discrimination may be done without having additional different optical filters superimposing on the first and second incident surfaces A1, A2 of the first and second photo-detectors 122, 124. In the embodiment where the first and second photo-detectors 122, 124 that are shielded with similar optical filters (not shown) for additional functionality, wavelengths detection may be possible but certain range of wavelengths filtered out by the optical filters (not shown) may not be detected. However, if the optical filters (not shown) superimposed on the first and second photo-detectors 122, 124 are dissimilar, wavelength detection or wavelength discrimination may be substantially degraded.

Although an ambient light sensor 100 is illustrated in the embodiment shown in FIGS. 1A-1C, the teaching may be application to other similar optical sensors or other opto-electronic devices, opto-electronic components and opto-electronic packaging for some other applications other than ambient light sensing. The optical sensors may be optical sensors used in fiber optics transceivers, camera chips or color sensors. Throughout the specification and the claims, when one of the optical sensor, optical device, optical apparatus, and ambient light sensor is mentioned, all other variations, including not specifically mentioned in this Specification, should be taken into consideration.

Figure 2A:
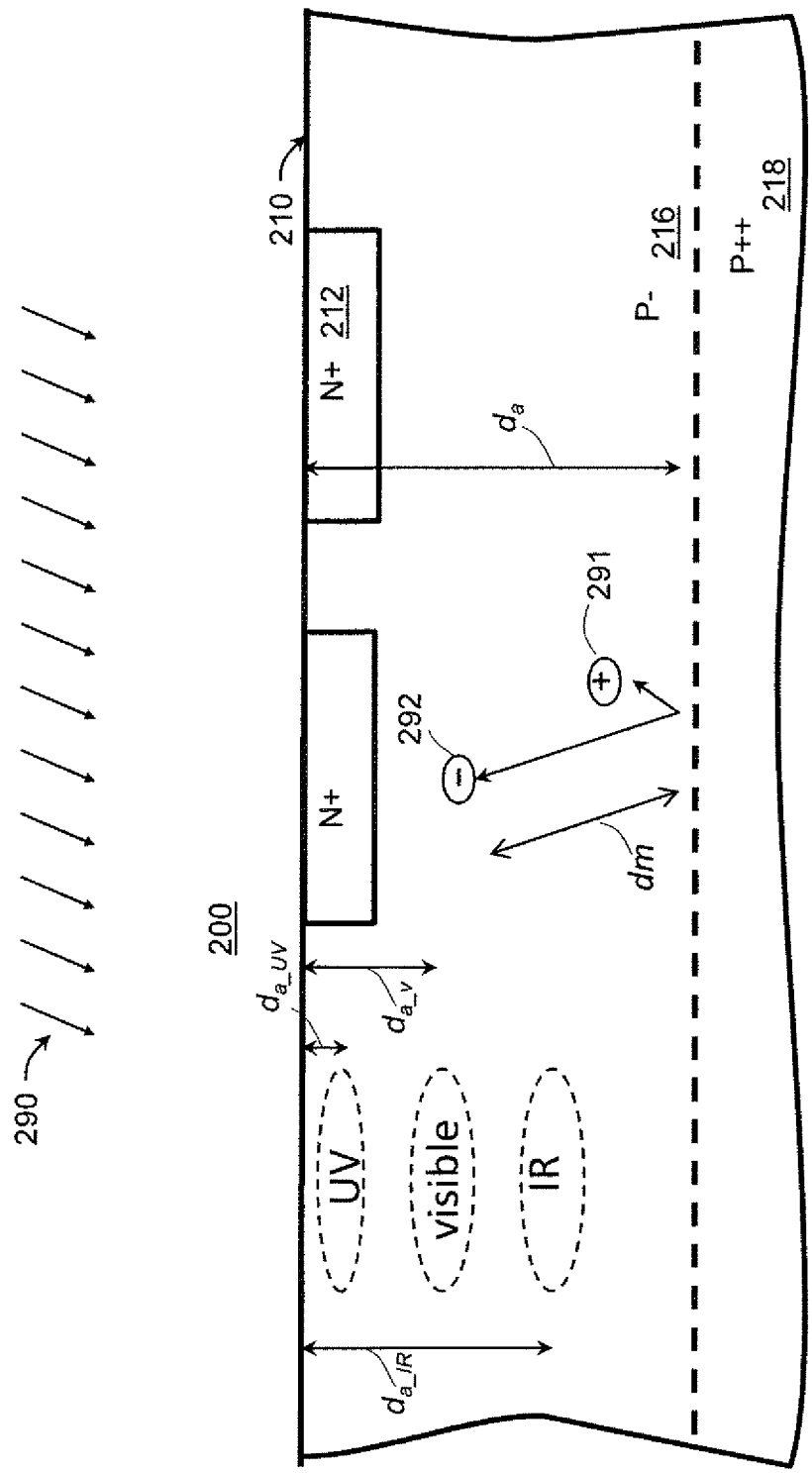
FIG. 2A illustrates a cross-sectional view of an optical sensor before biasing voltages are applied.

FIG. 2A illustrates a cross-sectional view of an optical sensor 200. The optical sensor 200 may be a monolithic semiconductor die formed using a Complimentary metal oxide semiconductor (or referred hereinafter as "CMOS") technology having a $P^+$ or $P^{++}$ substrate 218. The optical sensor 200 may be configured to be exposed to incident light 290. A less lightly doped $P^-$ region 216 may be formed coupling the $P^{++}$ substrate 218. The $P^-$ region 216 may be epitaxial region but need not be. A PN junction may be formed by using an $N^+$ region 212 formed on the $P^-$ region 216. The polarity of the semiconductor may be reversed. For example, in other embodiment, the substrate 218 may be $N^+$. A $N^-$ region 216 may be formed above the substrate 218, whereas a P+ region 212 may be formed near the surface to obtain a PN junction.

As shown in FIG. 2A, the incident light 290 may cause to generate a pair of excitons, comprising a free excited electron 292 and a corresponding excited hole 291. The free electron 292 or the hole 291 may travel for a distance before losing the excited energy and recombined within the semiconductor region 216. Statistically, the free excited electron 292 may travel for an effective travel distance $d_m$ before recombination although in reality, some may travel more distance and some may travel less distance. The effective travel distance $d_m$ may depend on the doping of the semiconductor region 216. If the doping is higher, the effective travel distance $d_m$ may be shorter. Without voltage biasing, the free excited electron 292 and the corresponding hole 291 may subsequently recombine.

The P$^-$ semiconductor region 216 of the optical sensor 200 may have a wavelength dependent absorption depth $d_a$. The wavelength dependent absorption depth $d_a$ may be measuring substantially perpendicularly from a surface 210 receiving the incident light 290, to a distance where statistically most of the light of a specific wavelength is absorbed. For example, most ultra violet light may cause exitons to be generated approximately in the depth, $d_{a\_UV}$ from the incident surface 210 as shown in FIG. 2A. Therefore, the distance $d_{a\_UV}$ will be defined as the absorption depth of the ultra violet light. However, some ultra violet light ray may penetrate deeper or shallower compared to the wavelength absorption depth for ultra violet $d_{a\_UV}$ as explained earlier.

As shown in FIG. 2A, the wavelength dependent absorption depth $d_a$ may be deeper for light having higher wavelength. For example, the wavelength absorption depth for ultra violet $d_{a\_UV}$ and the wavelength absorption depth for visible light $d_{a\_v}$ may be relatively smaller than the wavelength absorption depth for infrared $d_{a\_IR}$. Similarly, the wavelength absorption depth for ultra violet $d_{a\_UV}$ may be relatively shorter than the wavelength absorption depth for visible light $d_{a\_v}$.

Figure 2B:
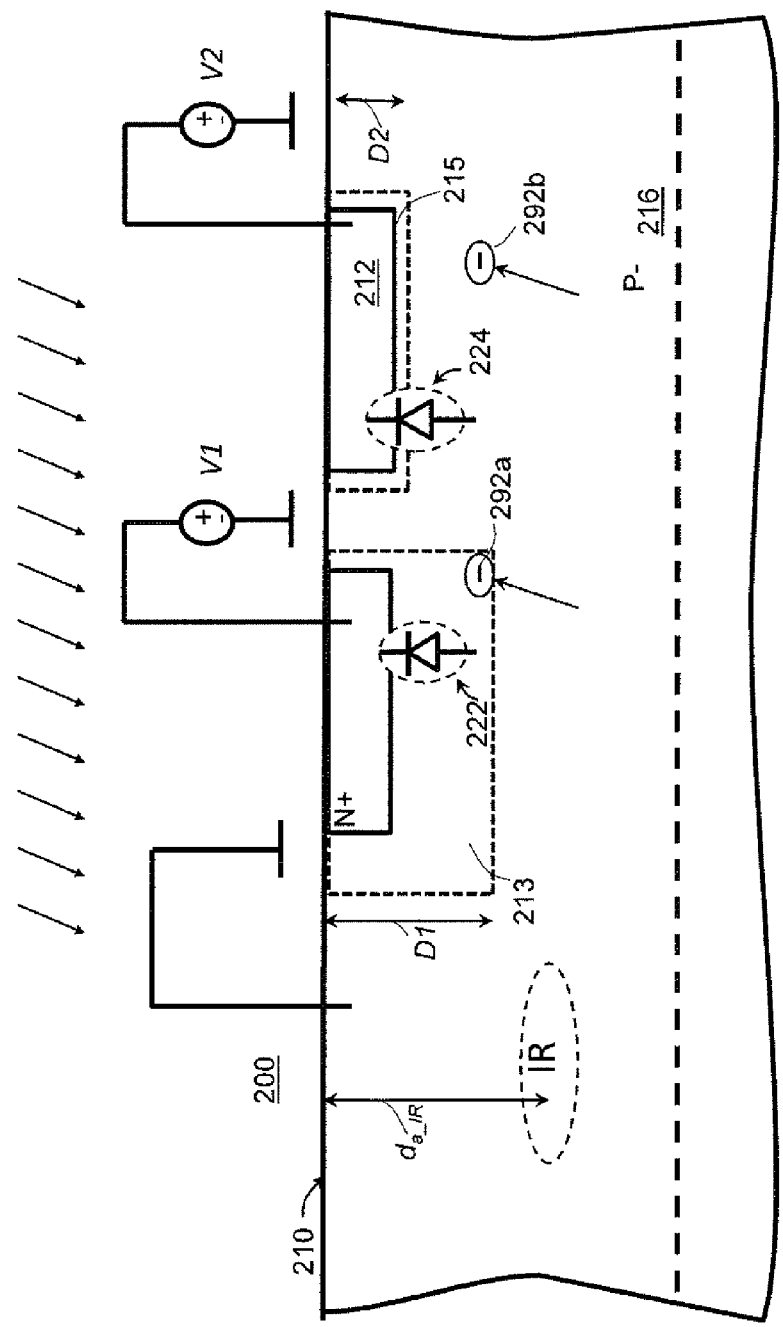
FIG. 2B illustrates a cross-sectional view of the optical sensor shown in FIG. 2A after biasing voltages are applied.

FIG. 2B illustrates a cross-sectional view of the optical sensor 200 shown in FIG. 2A after biasing voltages V1 and V2 are applied. The P$^-$ region 216 and N$^+$ region 212 may be reversed biased. In other words, the optical sensor 200 may comprise first and second photo-detectors 222, 224 that are reverse biased. The first and second photo-detectors 222, 224 may be biased at different voltages causing depletion regions 213, 215 to be formed at each of the first and second photo-detectors 222, 224. As the biasing voltages V1, V2 may differ, the respective depletion regions 213, 215 may have substantially different dimensions. Hence, the first and second photo-detectors 222, 224 may have respective first and second depths D1, D2 extending substantially perpendicularly from the incident surface 210 to the respective depletion regions 213, 215 respectively.

The first and second photo-detectors 222, 224 may respond differently to light of a predetermined wavelength. This may be explained by considering an example comprising first and second excited free electrons 292a, 292b shown in FIG. 2B. In this example, the two excited free electrons 292a, 292b may be caused by infrared light and being generated approximately at a distance of the wavelength absorption depth for infrared $d_{a\_IR}$ measuring from the incident surface 210. As shown in FIG. 2B, the first depletion region 213 may be deep enough that the first free electron 292a may enter the depletion region 213 causing a photo-current to be generated within the first photo-detector 222. However, as the depletion region 215 of the second photo-detector 224 may be shallower, the second excited free electron 292h may be recombined before entering the depletion region 215 and thus, no photo-current is detected. The free excited electrons 292a, 292b may be generated within the N$^+$ region 212 when the incident light 290 comprises ultraviolet but since the N$^+$ region 212 is usually more highly doped, most of the excited free electrons 292a, 292b may recombine before entering the depletion regions 213, 215, causing very little photo-currents to be detected for light having wavelength of ultraviolet region.

Figure 2C:
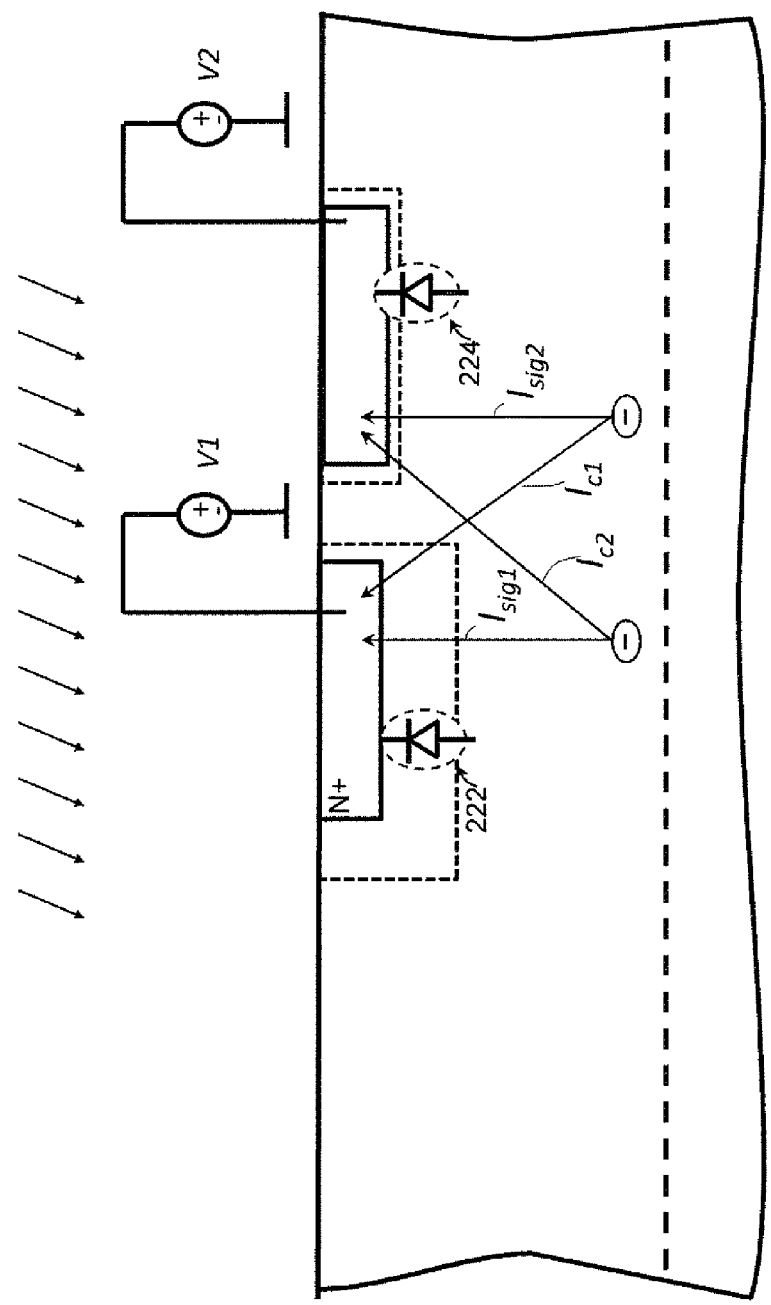
FIG. 2C illustrates coupling photo-currents detected in the photo-detectors of the optical sensor shown in FIG. 2A.

As shown in FIG. 2C, the first and second photo-detectors 222, 224 may be formed proximate to each other such that not only photo-signals $I_{sig1}$, $I_{sig2}$ are to be collected and detected in the each of the first and second photo-detectors 222, 224 respectively, but also coupling photo-signals $I_{C1}$, $I_{C2}$ are caused to be detected. Theoretically, applying different biasing voltages V1, V2 may yield two different photo-detectors depths D1, D2 so that coupling photo-signals $I_{C1}$, $I_{C2}$ generated in the first and second photo-detectors 222, 224 are substantially different. However, there is a limit as biasing voltages V1, V2 as high voltages may consume more power.

Figure 3A:
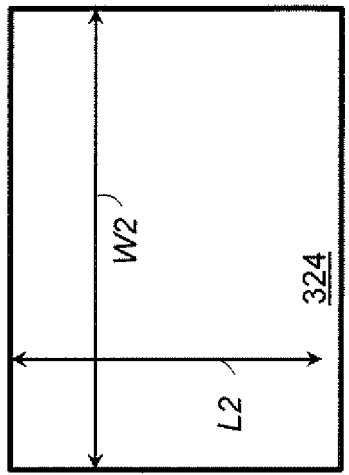
FIG. 3A illustrates a top view of an optical device.
Figure 3A:
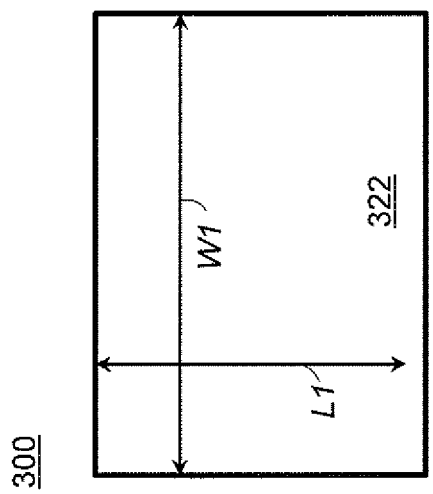
Figure 3B:
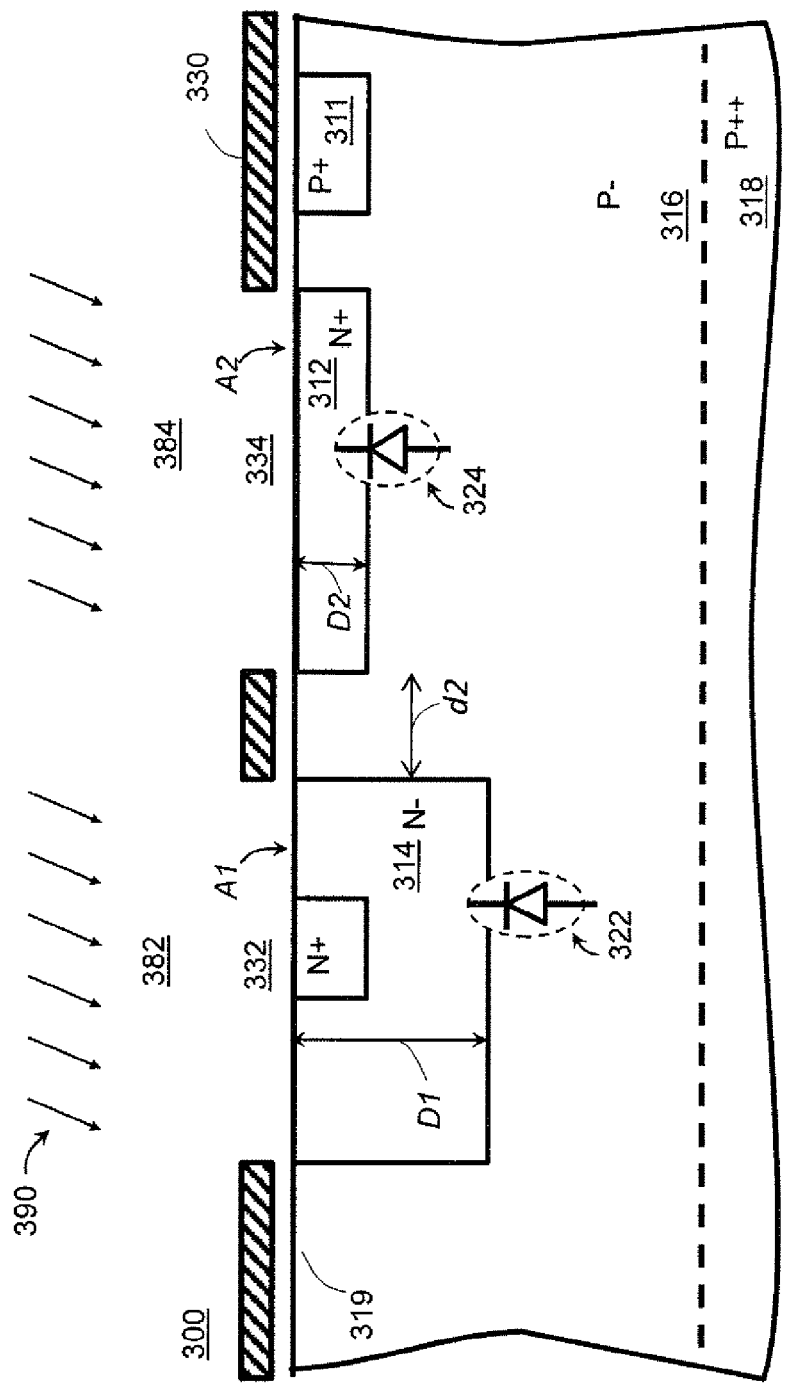
FIG. 3B illustrates a cross-sectional view of the optical device shown in FIG. 3A without biasing voltages.

FIG. 3A illustrates a top view of an optical device 300. FIG. 3B illustrates a cross-sectional view of the optical device 300 shown in FIG. 3A without biasing voltages. Referring to FIGS. 3A and 3B, the optical device 300 may comprise a first photo-detector 322, a second photo-detector 324. Both the first and second photo-detectors 322, 324 may be exposed to the incident light 390.

As shown in FIG. 3A, the first photo-detector 322 may have a first width dimension W1 and a first length dimension L1, whereas the second photo-detector 324 may have a second width dimension W2 and a second length dimension L2. For the first and second photo-detectors 322, 324 to receive similar amount of the incident light 390, the first width dimension W1 may be substantially similar to the second width dimension W2, whereas the first length dimension L1 may be substantially similar to the second length dimension L2.

As shown in FIG. 313, the first photo-detector 322 has a first incident surface A1 for receiving the incident light 390 whereas the second photo-detector 324 may have a second incident surface A2 for receiving the incident light 390. Although a rectangular shape are shown in the embodiment illustrated in FIGS. 3A and 3B, the first and second photo-detectors 322, 324 need not be rectangular but may define any shape so long as the first and second incident surfaces A1, A2 are substantially similar in size and shape such that similar amount and portion of light 390 are detected in the first and second photo-detectors 322, 324.

As shown in FIG. 3B, the optical device 300 may be a monolithic semiconductor die comprising a less lightly doped P$^-$ region 316 coupling the P$^{++}$ substrate 318. The P$^-$ region 316 may be epitaxial region but need not be. The first and second photo-detectors 322, 324 may be formed in a monolithic P" region 316 or P-type substrate 316. More specifically, the first photo-detector 322 may be an NWell-PSUB type of photodiode formed between N-well or also referred to as N$^-$ region 314, and the P$^-$ region 316. The second photo-detector 324 may be an N$^+$-PSUB type of photodiode formed between N$^+$ region 312 and the P$^-$ region 316. The P$^-$ region 316 and the P$^{++}$ substrate 318 may be biased electrically through a P$^+$ region 311 that is highly doped to provide ohmic contact.

The first and second photo-detectors 322, 324 may be located in close proximity such that the light 390 falling onto the first and second photo-detectors 322, 324 may be substantially similar. For instance, the first and second photo-detectors 322, 324 may be spaced apart by a distance d2. As discussed previously, the distance d2 may be technology dependent and may depend on the ability of free carrier, either electron or hole may travel before recombination after being generated or excited by photons. In the embodiment shown in FIG. 3B where the first and second photo-detectors 322, 324 are formed using a CMOS technology, the distance d2 may be selected to be less than 25 um.

Similarly, the optical device 300 may comprise an optional metal layer 330 having first and second apertures 332, 334 exposing the first and second photo-detectors 322, 324 to the incident light 390. With the metal layer 330, the surrounding areas 319 outside the first and second photo-detectors 322, 324 surrounding the first and second photo-detectors 322, 324 may be shielded from light. As discussed previously, shielding the surrounding areas 319 outside the first and second photo-detectors 322, 324 may be advantageous so that photo-currents may be generated merely below the photo-detectors 322, 324 and not anywhere in the P⁻ region 316.

As shown in FIG. 3B, the first and second photo-detectors 322, 324 may be unshielded and may be covered by a substantially transparent material 382, 384. The substantially transparent material 382, 384 may be a passivation layer in CMOS technology that allows light to be transmitted through with less than approximately 5% light loss. In another embodiment, both the first and second photo-detectors 322, 324 may be covered by color filters (not shown) respectively. However, the respective color filters (not shown) covering the first and second photo-detectors 322, 324 may be substantially similar such that the first and second photo-detectors 322, 324 may be configured to received substantially similar light 390.

Figure 3C:
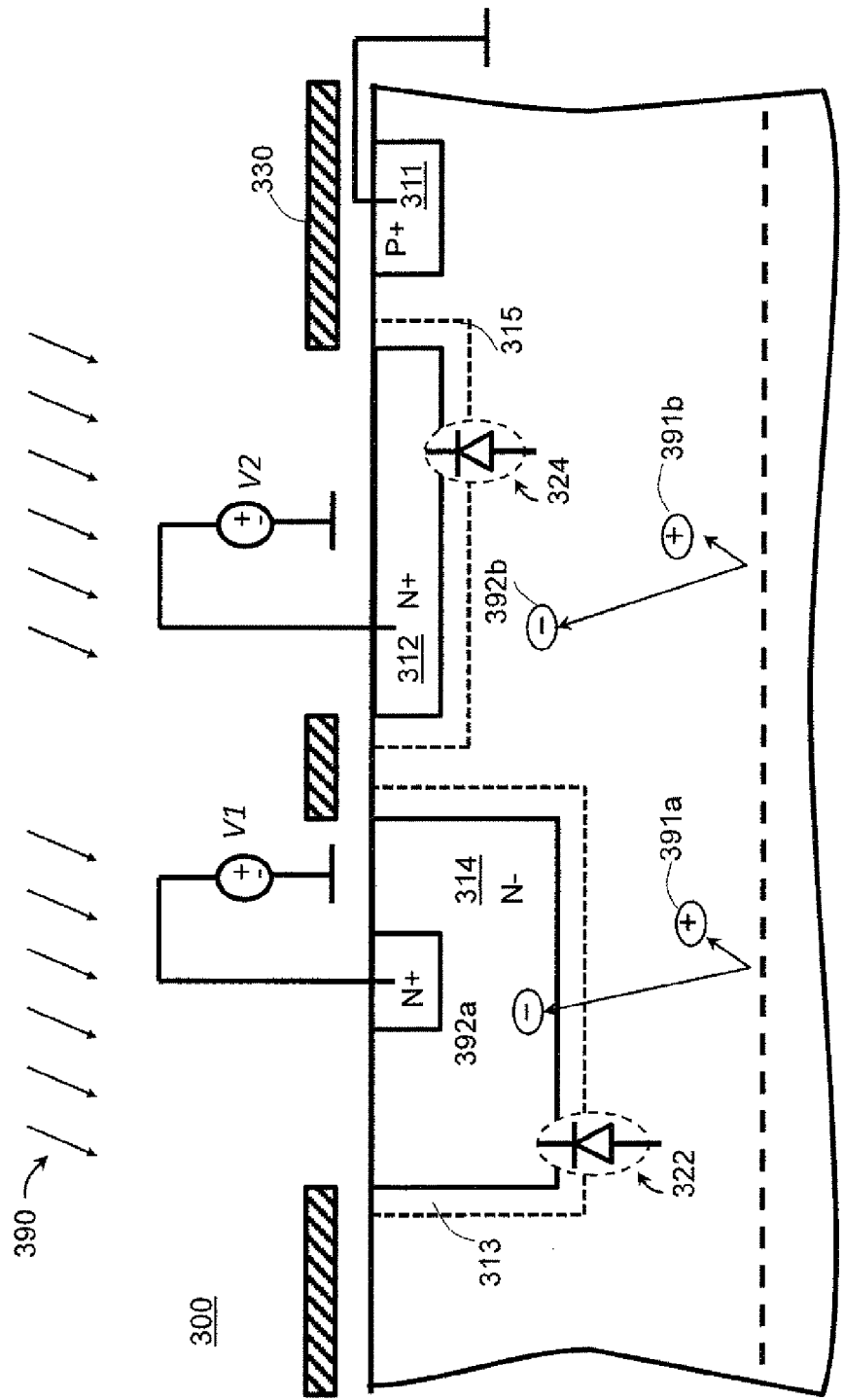
FIG. 3C illustrates a cross-sectional view of the optical device shown in FIG. 3A with biasing voltages.

As shown in FIG. 3B, the first and second photo-detectors 322, 324 may have first and second depths D1, D2 respectively extending substantially perpendicular from the first and second incident surfaces A1, A2 to the boundary of the N⁺ region and P⁻ region 316 respectively. FIG. 3C illustrates a cross-sectional view of the optical device 300 shown in FIG. 3A with biasing voltages. As shown in FIG. 3C, each of the first and second photo-detectors 322, 324 may be a reverse biased photo-diode having a depletion region 313, 315 respectively.

The biasing voltages V1, V2 may be substantially similar so that the ability of the first and second photo-detectors 322, 324 to collect photo-currents remains similar, other than the difference based on the fact that the first and second photo-detectors 322, 324 have different depths D1, D2 . On some occasions, the first and second depths D1, D2 may be measured perpendicularly from the incident surfaces A1, A2 to the depletion regions respectively 313, 315.

The first depth D1 may be relatively larger than the second depth D2 such that the first and second photo-detectors 322, 324 respond differently to light of a predetermined wavelength. For example, consider free electrons 392a, 392b and holes 391a, 391b generated at a depth below the first and second photo-detectors 322, 324 by infrared light. The free electrons 392a, 392b may move towards the N⁺ region 312 due to the positive biasing voltages whereas the holes 391a, 391b may move towards P⁺ region 311 that may be biased to a lower voltage or to ground. As the first depth D1 may be deeper, the free electron 392a may be received within the depletion region 313 to induce a photo-current. However, with the second depth D2 being selected to be shallower, the free electron 392b may be recombined without including any photo-current. However, for light having lower wavelength, the free electrons 392a, 392b may be collected in both of the depletion regions 313, 315. By comparing the photo-currents (not shown), an indication of the spectral content of the light may be obtained.

Figure 3D:
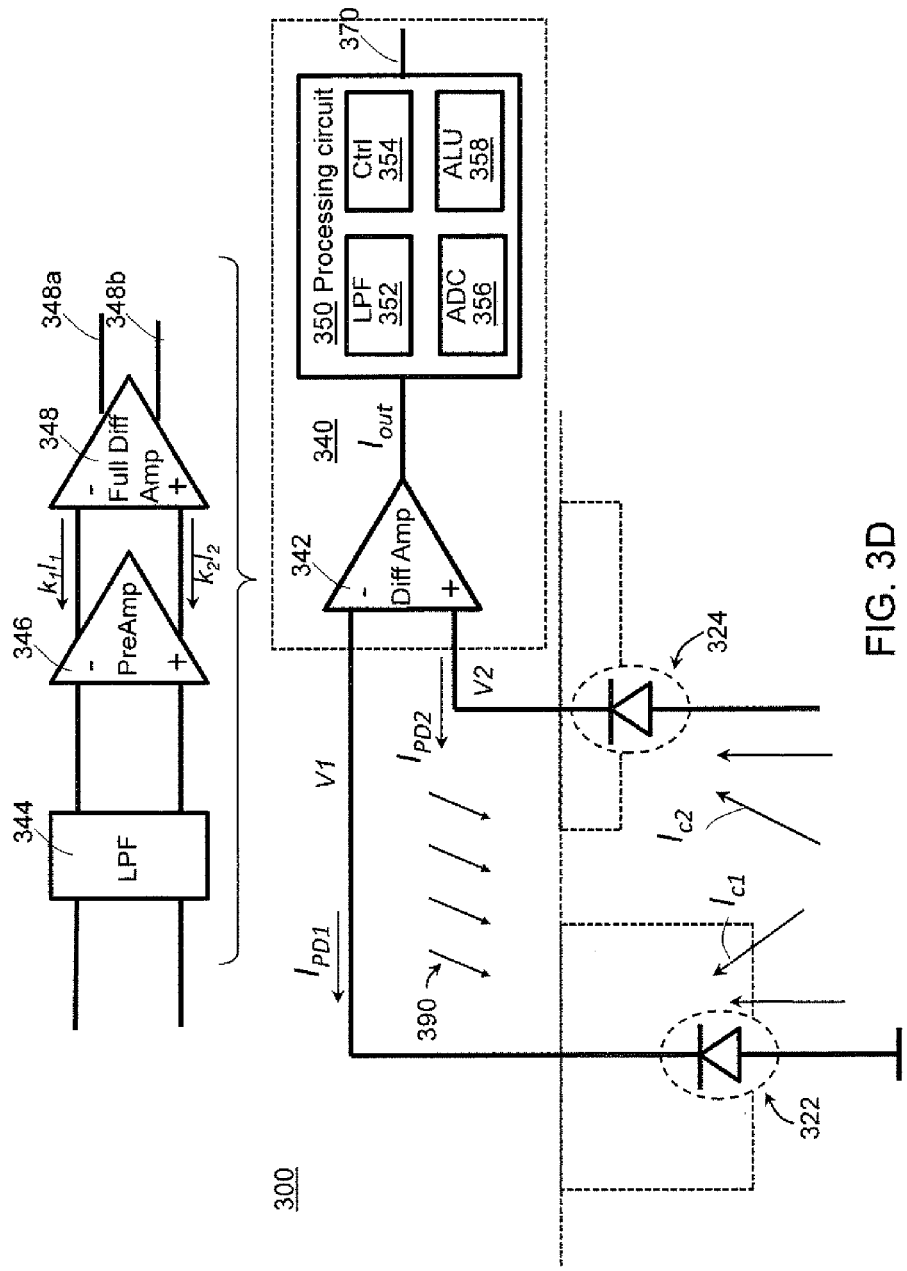
FIG. 3D illustrates an illustrative view of the optical device shown in FIG. 3A having first and second photo-detectors and a circuit.

As shown in FIG. 3D, the optical device 300 may further comprise a circuit 340 in addition to the first and second photo-detectors 322, 324. FIG. 3D illustrates an illustrative view of the optical device 300 with the first and second photo-detectors 322, 324 being coupled to a circuit 340. The circuit 340 may be configured to determine an indication of spectral content of the light 390. The circuit 340 may also be configured to provide biasing voltages V1, V2 to the first and second photo-detectors 322, 324. Similar to the previously presented embodiments, the first photo-detector 322 may configured to be exposed to the light 390, to generate therein a first photo-current $I_{PD1}$ in response to the incident light 390, whereas the second photo-detector 324 may be configured to be exposed to the incident light 390 to generate therein a second photo-current $I_{PD2}$ in response to the incident light 390.

The first and second photo-detectors 322, 324 may be formed proximate to but distanced away from each other that coupling photo-signals $I_{C1}$, $I_{C2}$ may be received. As illustrated in FIG. 3D, the first photo-current $I_{PD1}$ may comprise a first photo-signal $I_{SIG1}$ from the first photo-detector 322, and a first cross-coupling photo-signal $I_{C1}$ from the second photo-detector 324. Similarly, the second photo-current $I_{PD2}$ may comprise a second photo-signal $I_{SIG2}$ from the second photo-detector 324 and a second cross-coupling photo-signal $I_{C2}$ from the first photo-detector 322. As shown in FIG. 3D, the first depth D1 of the first photo-detector 322 and the second depth D2 of the second photo-detector 324 may differ from each other such that the first and second cross-coupling photo-signals $I_{C1}$, $I_{C2}$ respond substantially differently to the light of a predetermined wavelength.

In the embodiment shown in FIG. 3D, although the first and second photo-detectors 322, 324 may have different depths D1, D2, the first and second photo-signals $I_{SIG1}$, $I_{SIG2}$ may be made substantially similar with at least some the following conditions. First, the first and second photo-detectors 322, 324 may be configured to receive substantially similar light. Second, the first and second photo-detectors 322, 324 may be spaced apart, and yet being positioned close enough to be affected by coupling photo-signals $I_{C1}$, $I_{C2}$. Third, areas outside the first and second photo-detectors 322, 324 may be shielded from the incident light 390. Fourth, both the first and second depths D1, D2 may be deep enough that most of the free electron excited by the incident light being received within the depletion regions 313, 315. With this arrangement, computing the difference between the first and second photo-currents $I_{PD1}$, $I_{PD2}$ may be equivalent to computing the difference between the first and second coupling photo-signals $I_{C1}$, $I_{C2}$.

The optical device 300 may comprise a differential amplifier 342, and other processing circuits 350. The differential amplifier 342 may comprise an analog low pass filter 344, a pre-amplifier 346 and a fully differential amplifier 348. The differential amplifier 342 may be configured to produce an output $I_{OUT}$ indicative of the difference between the first and second photo-currents $I_{PD1}$, $I_{PD2}$. In the embodiment shown in FIG. 3D where most of the four conditions mentioned above may be satisfied, the output $I_{OUT}$ may be indicative of the difference between the first and second coupling photo-signals $I_{C1}$, $I_{C2}$ instead of the first and second photo-currents $I_{PD1}$, $I_{PD2}$.

The analog low pass filter 344 may be configured to filter out noise or other higher frequency signals. On some occasions, weight factors may need to be multiplied to the first and second photo-currents $I_{PD1}$, $I_{PD2}$ for compensating known secondary effects, or to compensate the photo-currents $I_{PD1}$, $I_{PD2}$ if the first and second photo-detectors 322, 324 cannot be made substantially similar. If weight factors are needed to be multiplied to the first and second photo-currents $I_{PD1}$, $I_{PD2}$ differently, the output of the photo-detectors 322, 324 may be configured to be multiplied by weight factors k1, k2 prior to entering the fully differential amplifier 348 in the pre-amplifier 346 as illustrated in FIG. 3D.

The fully differential amplifier 348 may be configured to produce a differential output signal 348a comprising the differential signals of the first and second photo-currents $I_{PD1}$, $I_{PD2}$, as well as a common mode output signal 348b indicative of the common mode signal of the first and second photo-currents $I_{PD1}$, $I_{PD2}$. The differential output signal 348a may provide an indication of the wavelength of the incident light 390 whereas the common mode output signal 348b may be indicative of the intensity of the incident light 390. As both the photo-detectors 322, 324 in FIG. 3D are not shielded substantially, compared to other sensors using shielded photo-detectors (not shown), the optical device 300 may be more effective in detecting dimmer light using the common mode output signal 348b.

The processing circuits 350 may comprise a digital low pass filter (also referred as "LPF") 352, an analog-to-digital converter (also referred as "ADC") 356, a controller 354 and a arithmetic logic unit ("also referred as "ALU") 358. The digital filter (LPF) 352 may be configured to identify, and to filter out therein substantial portions of the first and second photo-currents $I_{PD1}$, $I_{PD2}$ caused by visible light from known light source such as fluorescent lamp. The controller 354 may be a Central Processing Unit (also referred as "CPU") of a computer, a processor or a digital signal processor (also referred as "DSP") or any other circuits with processing capability. The ALU 358 may be configured to carry out arithmetic functions such as subtraction and divisions to compute a signal 370 indicative of ratio of the difference between the first and second photo-currents $I_{PD1}$, $I_{PD2}$ to one of the first or second photo-currents $I_{PD1}$, $I_{PD2}$.

Figure 4:
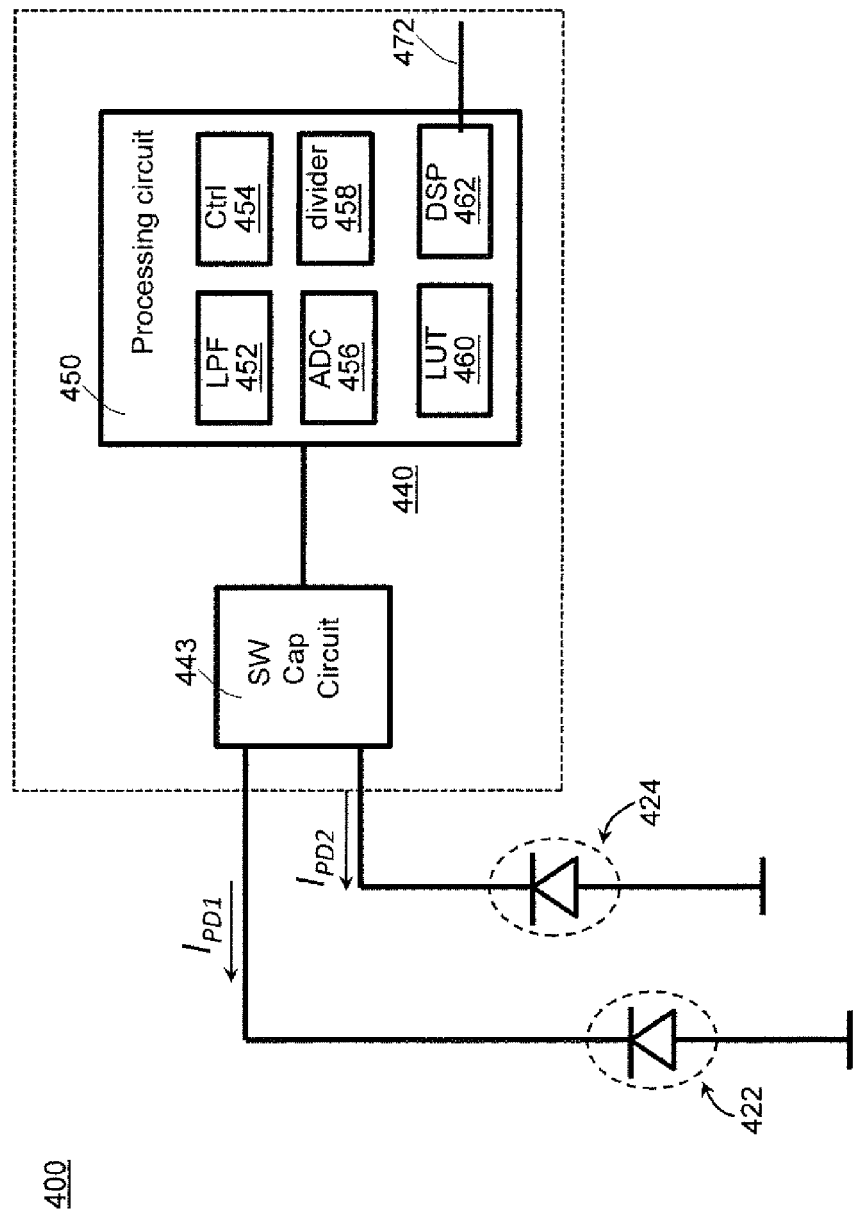
FIG. 4 illustrates an optical device having a switch capacitor circuit.

FIG. 4 illustrates an optical device 400 having a first photo-detector 422, a second photo-detector 424 and a circuit 440. The optical device 400 may be similar to the optical device 300 but differs at least in that the circuit 440 may comprise a switch capacitor circuit 443. For example, the output of the first and second photo-detectors 422, 424 may be coupled to the switch capacitor circuit 443. The switch capacitor circuit 443 may operate in differential mode to detect the difference between the first and second photo-currents $I_{PD1}$, $I_{PD2}$. Alternatively, the switch capacitor circuit 443 may operate in common mode combining the first and second photo-currents $I_{PD1}$, $I_{PD2}$ for detecting ambient light, especially to detect light having weak intensity. The circuit 440 may further comprise a processing circuits 450 having a LPF 452, a controller 454, an ADC 456, a divider circuit 458, a look-up-table (also referred as "LUT") 460, and a DSP 462.

The DSP 462 may be configured to compute a signal 472 indicative of ratio of the difference between the first and second photo-currents $I_{PD1}$, $I_{PD2}$ to one of the first or second photo-currents $I_{PD1}$, $I_{PD2}$. In another embodiment, the signal 472 may be indicative of ratio of the difference between coupling photo-currents (not shown) to one of the first or second photo-currents $I_{PD1}$, $I_{PD2}$. The LUT 460 may store characterized data that relates the ratio of the first and second photo-currents $I_{PD1}$, $I_{PD2}$ to one of the first or second photo-currents $I_{PD1}$, $I_{PD2}$. By comparing the signal 472 computed by the DSP 462 to the LUT 460, types of light sources used to generate the incident light may be identified.

Figure 5A:
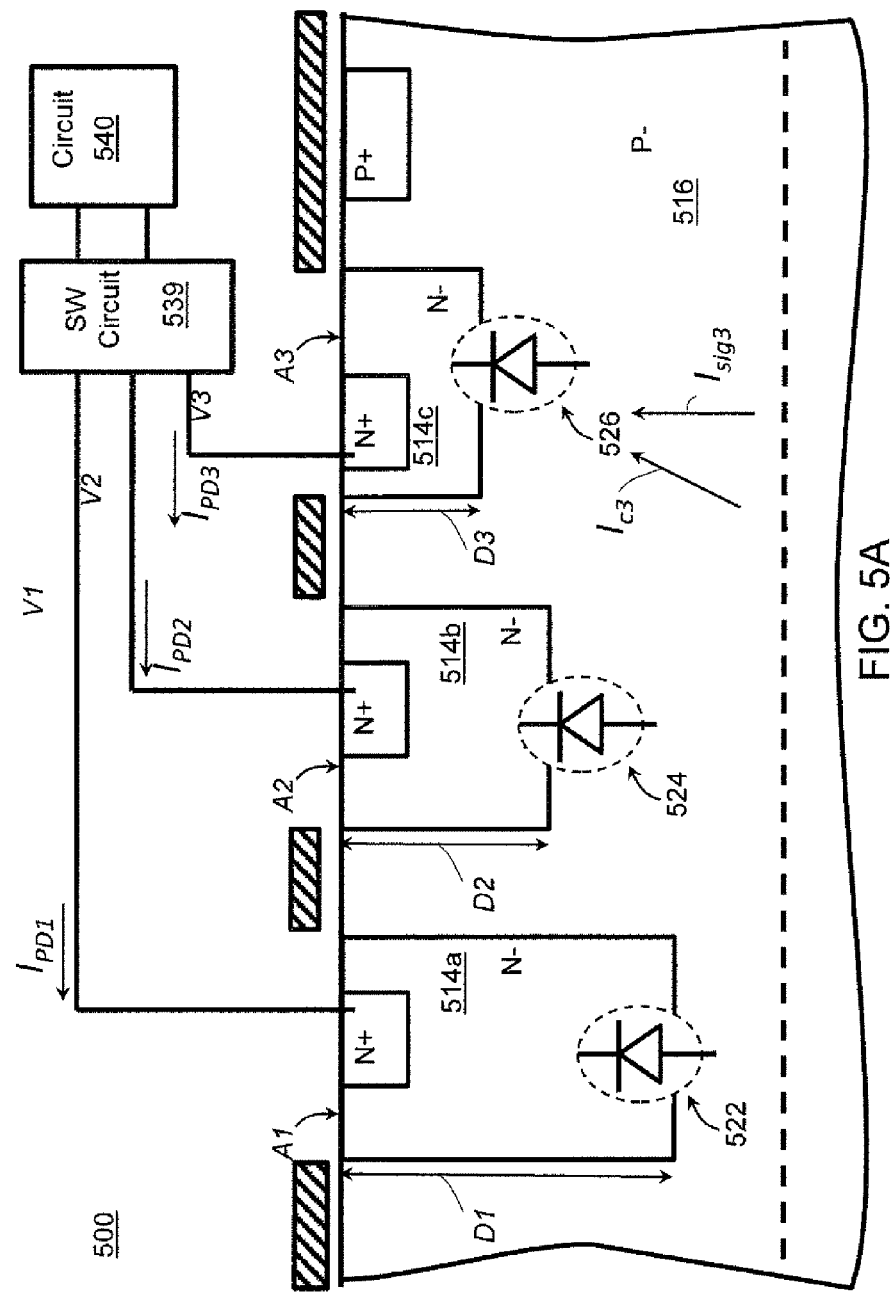
FIG. 5A illustrates an optical device having first, second and third photo-detectors having different depths.

FIG. 5A illustrates another embodiment of an optical device 500. The optical device 500 may comprise a first photo-detector 522, a second photo-detector 524, a third photo-detector 526, a circuit 540 and a switching circuit 539. The first, second and third photo-detector 522, 524, 526 may be configured to generate photo-currents $I_{PD1}$, $I_{PD2}$, $I_{PD3}$ respectively. The switching circuit 539 may be configured to selectively couple two of the first, second and third detectors 522, 524, 526 to the circuit 540. In other words, two of the first, second and third photo-currents $I_{PD1}$, $I_{PD2}$, $I_{PD3}$ may be connected to the circuit 540 for signal processing. The circuit 540 may have differential circuits (not shown) or processing circuits (not shown) as discussed previously in the embodiments shown in FIG. 3D and FIG. 4.

As shown in FIG. 5A, the first, second and third photo-detectors 522, 524 526 may have first, second and third depths D1, D2, D3 respectively extending substantially perpendicular from the first, second and third incident surfaces A1, A2, A3 for receiving light. The respective first, second and third incident surfaces A1, A2, A3 of the first, second and third photo-detectors 522, 524 526 may have substantially similar shape and dimension and may be place proximate to but distanced away from each other such that the first, second and third photo-detectors 522, 524 526 may receive substantially similar amount and portions of light. In addition, the first, second, and third photo-detectors 522, 524 526 may be configured to be biased at a substantially similar voltage values V1, V2, V3 to minimize impact on the photo-detectors 522, 524 526 caused by the biasing voltages V1, V2, V3. In other words, the voltage values V1, V2, V3 may be substantially similar.

The first and second photo-detectors 522, 524 may be formed proximate to but distanced away from each other such that coupling photo-signals (not shown) from the respective photo-detectors 522, 524 may be detected by each other. However, the third photo-detector 526 may be formed proximate to but distanced away from at least one of the first and second photo-detectors 522, 524 such that the third photo-detector third photo-detector 526 may be configured to generate a third photo-current $I_{PD3}$ comprising a third photo-signal $I_{SIG3}$ generated within the third photo-detector 526 and a third coupling photo-signal $I_{C3}$ generated in at least one of the first and second photo-detectors 522, 524. In embodiment shown in FIG. 5A, the third coupling photo-signal $I_{C3}$ may be generated in both the first and second photo-detectors 522, 524. However, the third coupling signal $I_{C3}$ may be more susceptible to the second photo-detector 524 compared to the first photo-detector 522.

As shown in FIG. 5A, the first, second and third photo-detectors 522, 524, 526 may be NWell-PSUB type of photo-diodes formed on a monolithic substrate 516. More specifically, both the first and second photo-detectors 522, 524 may be formed using N-Well-P-sub photo-detector similar to the first photo-detector 322 shown in FIG. 3C. Similarly, the third photo-detector 526 may be a N-Well-P-sub photo-detector. However, the N-Wells 514a, 514b, 514c in the first, second and third photo-detectors 522, 524, 526 may have different well depths D1, D2, D3, such that the first, second and third photo-detectors 522, 524, 526 may have different depths D1, D2, D3. The N-Wells 514a, 514b, 514c in the first, second and third photo-detectors 522, 524, 526 may comprise substantially similar semiconductor material respectively.

Figure 5B:
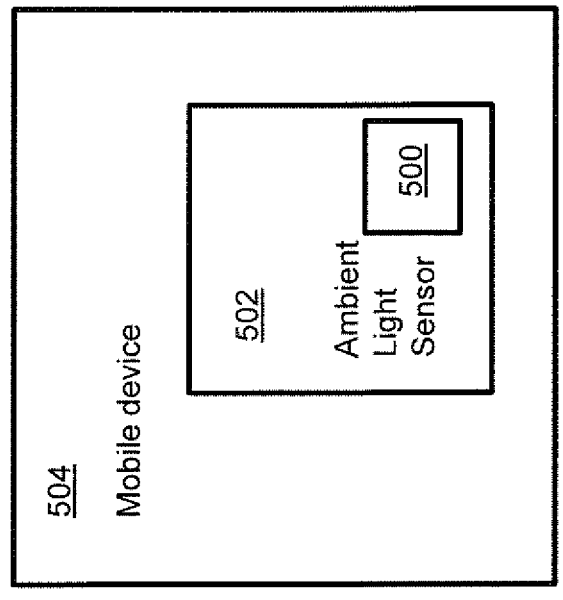
FIG. 5B illustrates a block diagram of a camera.
Figure 5C:
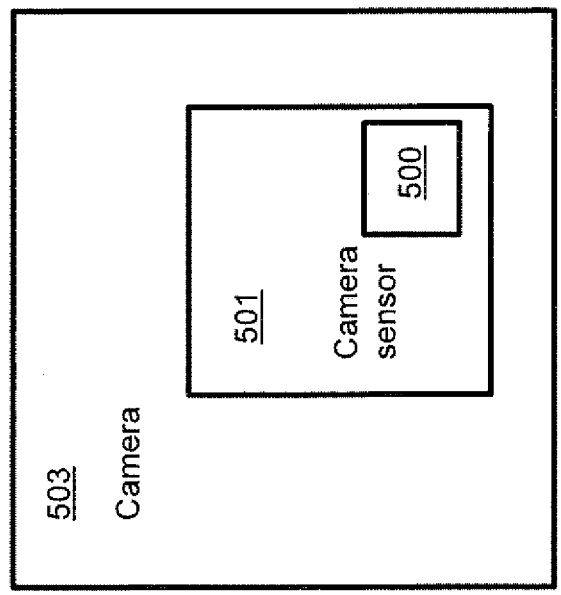
FIG. 5C illustrates a block diagram of a mobile device.

The optical device 500 may be used in camera and ambient light sensors. FIG. 5B illustrates a block diagram of a camera 503. As shown in FIG. 5B, the optical device 500 may be part of a camera sensor 501 that forms a portion of a camera 503. FIG. 5C illustrates a block diagram of a mobile device 504. The optical device 500 may be part of an ambient light sensor 502 that forms a portion of a mobile device 504.

Figure 6:
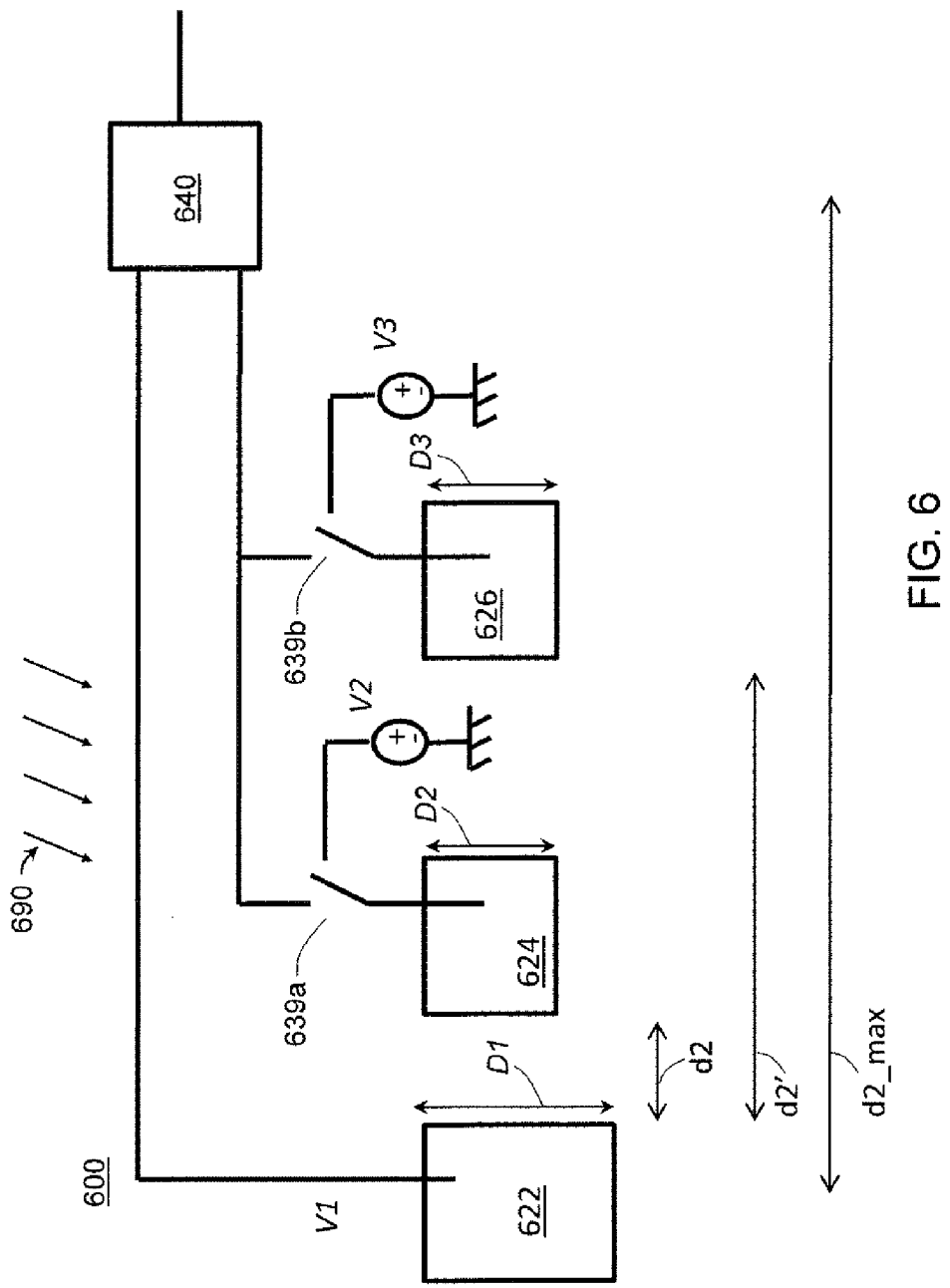
FIG. 6 illustrates an illustrative view of an optical sensor having first, second and third photo-detectors coupled to a differential amplifier through a switching circuit.

FIG. 6 illustrates an optical device 600. The optical device 600 may comprise a first photo-detector 622, a second photo-detector 624, a third photo-detector 626, a circuit 640 and switching circuits 639a, 639b. The first, second and third photo-detectors 622, 624, 626 may be exposed to incident light 690. The optical device 600 may be configured to detect and compare light of two specific wavelengths by switching between a first photo-detector pair 622, 624 and a second photo-detector pair 622, 626. This may be achieved by using the switching circuits 639a, 639b. As shown in FIG. 6, the first photo-detector 622 may be coupled directly to the circuit 640 whereas the switching circuits 639a, 639b may selectively couple one of the second and third photo-detectors 624, 626 to the circuit 640. With this arrangement, the circuit 640 may be electrically coupled to either the first and second photo-detectors 622, 624, or to the first and third photo-detectors 622, 626.

The first photo-detector pair 622, 624 and the second photo-detector pair 622, 626 may be spaced apart in different manner. For example, the first photo-detector pair 622, 624 may be spaced apart by a distance d2, whereas the photo-detector second pair 622, 626 may be spaced apart by a distance d2' that may be longer or shorter than the distance d2. As the distances are different, coupling currents (not shown) may be collected differently depending on the wavelength of the incident light 690. The first photo-detectors 622 may have a depth D1 that may be either deeper or shallower compared to the depths D2, D3 of the second and third photo-detectors 624, 626. All other parameters affecting coupling current may be made similar. At least for this reason, the second and third photo-detectors 624, 626 may have substantially similar depths D2, D3.

In addition, when one of the second and third photo-detectors 624, 626 are disconnected from the circuit 640, the one of the second and third photo-detectors 624, 626 may be electrically biased at a voltage of V2 or V3 that is substantially similar to the biasing voltage V1 of the first photo-detector 622. In this manner, any of the photo-detectors 624, 626 that is temporary disconnected may still collect free electron excited by light, and may operate in the same manner as all of the photo-detectors 622, 624, 626 are electrically connected to the circuit 640. The photo-detectors 622, 624, 626 may have substantially similar size.

The optical device 600 may comprise additional photo-detectors (not shown) that may be connected to the circuit 640. The additional photo-detectors (not shown) may form additional photo-detector pairs with the first photo-detector 622 in a way similar to the third photo-detector 626. However, the additional photo-detectors (not shown) may be spaced apart from the first photo-detector 622 less than a distance d2_max. In one embodiment, the distance d2_max may be approximately 50 um. If the photo-detectors (not shown) are spaced apart more than d2_max, coupling photo-current detected may be substantially small to be of practical use.

Figure 7:
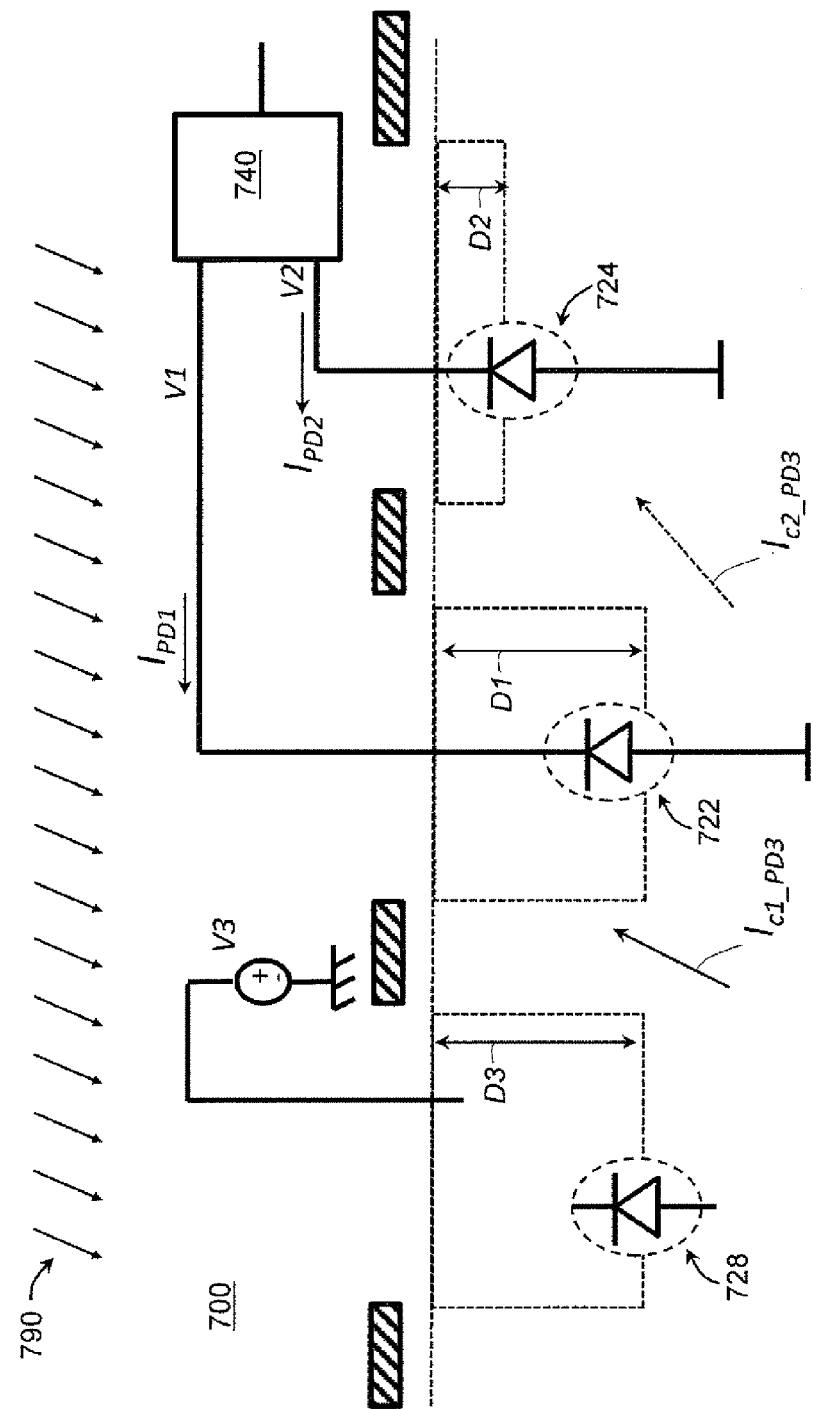
FIG. 7 illustrates an illustrative view of an optical sensor having first, second photo-detectors coupled to a differential circuit and a third photo-detector formed approximating at least one of the first and second photo-detectors.

FIG. 7 illustrates an illustrative view of an optical sensor 700 for sensing ambient light 790. The optical sensor 700 may comprise a first photo-detector 722 having a first depth D1, a second photo-detector 724 having a second depth D2 relatively deeper than the first depth D1 and a circuit 740 electrically coupled to the first and second photo-detectors 722, 724 for determining an indication of spectral content of the ambient light 790. The first and second photo-detectors 722, 724 may respond differently to light 790 of a specific predetermined wavelength because of the different depths D1, D2. For example, the first and second photo-detectors 722, 724 may be configured to generate photo-currents $I_{PD1}$, $I_{PD2}$ that may vary in value when the first and second photo-detectors 722, 724 are exposed to similar amount of light having a specific predetermined wavelength.

In addition, the optical sensor may further comprise a third photo-detector 728 proximate to but being distanced away from at least one of the first and second photo-detectors 722, 724. Unlike the third photo-detector 626 shown in FIG. 6, the third photo-detector 728 shown in FIG. 7 may not be used for collecting photo-currents and hence, the third photo-detector 728 may not be coupled to the circuit 740. Optionally, the third photo-detector 728 may be biased to a voltage V3, that may be substantially similar to the biasing voltages V1, V2 of the first and second photo-detectors 722, 724. Hence, the first, second, and third photo-detectors 722, 724, 728 may be configured to be biased at a substantially similar voltage values.

The first, second and third photo-detectors 722, 724, 728 may be configured to be exposed to the ambient light 790 and located in close proximity such that a coupling current may be generated in at least one of the first and second photo-detectors 722, 724 in response to light 790 detected in the third photo-detector 728. The first, second and third photo-detectors 722, 724, 728 may be distanced away from each other as shown in FIG. 7. For example, as shown in FIG. 7, a coupling current $I_{C1\_PD3}$ generated from the third photo-detector 728 may be detected in the first photo-detector 722, whereas a further coupling current $I_{C2\_PD3}$ generated from the third photo-detector 728 may be detected in the second photo-detector 724 in response to light received in the third photo-detector 728. In addition to the coupling currents $I_{C1\_PD3}$, $I_{C2\_PD3}$ from the third photo-detectors 728, the first and second photo-detectors 722, 724 may be detecting coupling currents (not shown) from each other.

As shown in FIG. 7, the third photo-detector 728 may be located closer to the first photo-detector 722 compared to the second photo-detector 724 such that the coupling current $I_{C1\_PD3}$ from the third photo-detector 728 detected in the first photo-detector 722 may be relatively larger than the further coupling current $I_{C2\_PD3}$ from the third photo-detector 728 detected in the second photo-detector 724. The third photo-detector 728 may have a third depth D3 substantially similar to one of the first and second depths D1, D2. Optionally, the third depth D3 may be different from the first and second depths D1, D2.

As the third photo-detector 728 may be located nearer to one of the first and second photo-detectors 722, 724, the coupling currents $I_{C1\_PD3}$, $I_{C1\_PD3}$, $I_{C2\_PD3}$ from the third photo-detector 728 detected in the first and second photo-detectors 722, 724 may be different. For example, in the embodiment shown in FIG. 7, the coupling current $I_{C1\_D3}$ detected in the first photo-detector 722 may be relatively larger than the further coupling current $I_{C1\_D3}$ detected in the second photo-detector 724. With the additional third photo-detector 722, difference of photo-currents $I_{PD1}$, $I_{PD2}$ detected in the first and second photo-detectors 722, 724 may be larger compared to a situation where the third photo-detector 722 is not used.

Figure 8:
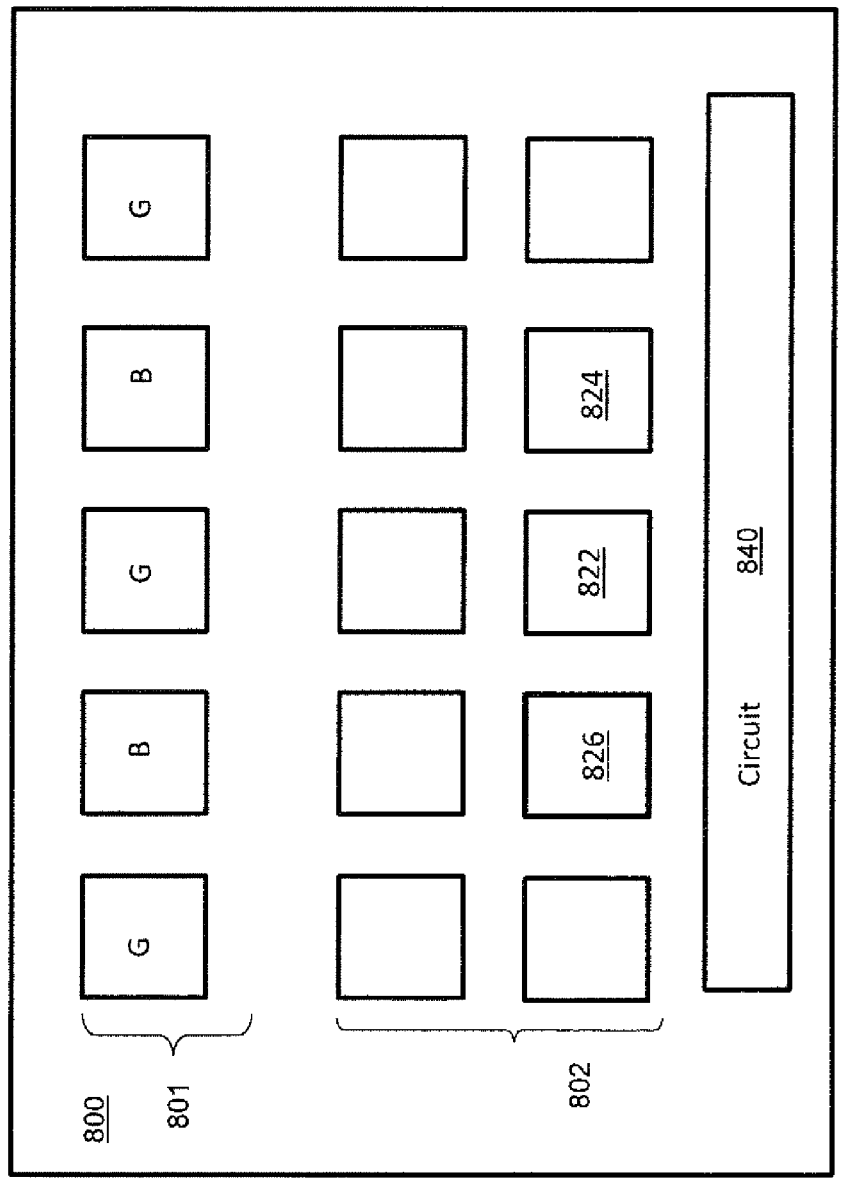
FIG. 8 illustrates a top view of a camera sensor.

The optical sensor 700 may be a portion of a camera chip 800 as shown in FIG. 8. The camera chip 800 may comprise a plurality of sensors 801 covered by red, green, and blue color filters arranged in a substantially matrix manner, and additional sensors 802 not covered by the color filters. The sensors 801, 802 may be connected to a circuit 840 comprising a sense-amplifier circuit (not shown), an analog to digital converter (not shown) and a processor (not shown). The additional sensors 802 may be distanced from the sensors 801 such that coupling currents from the sensors 801 may not be detected in the additional sensors 802. The additional sensors 802 may comprise a first photo-sensor 822, a second photo-sensor 824, and a third photo-sensor 826 that may operates in substantially similar manner to the first, second and third photo-detectors 722, 724, 728 illustrated in FIG. 7. The circuit 840 may operate in substantially similar manner to the circuit 740 shown in FIG. 7.

Figure 9:
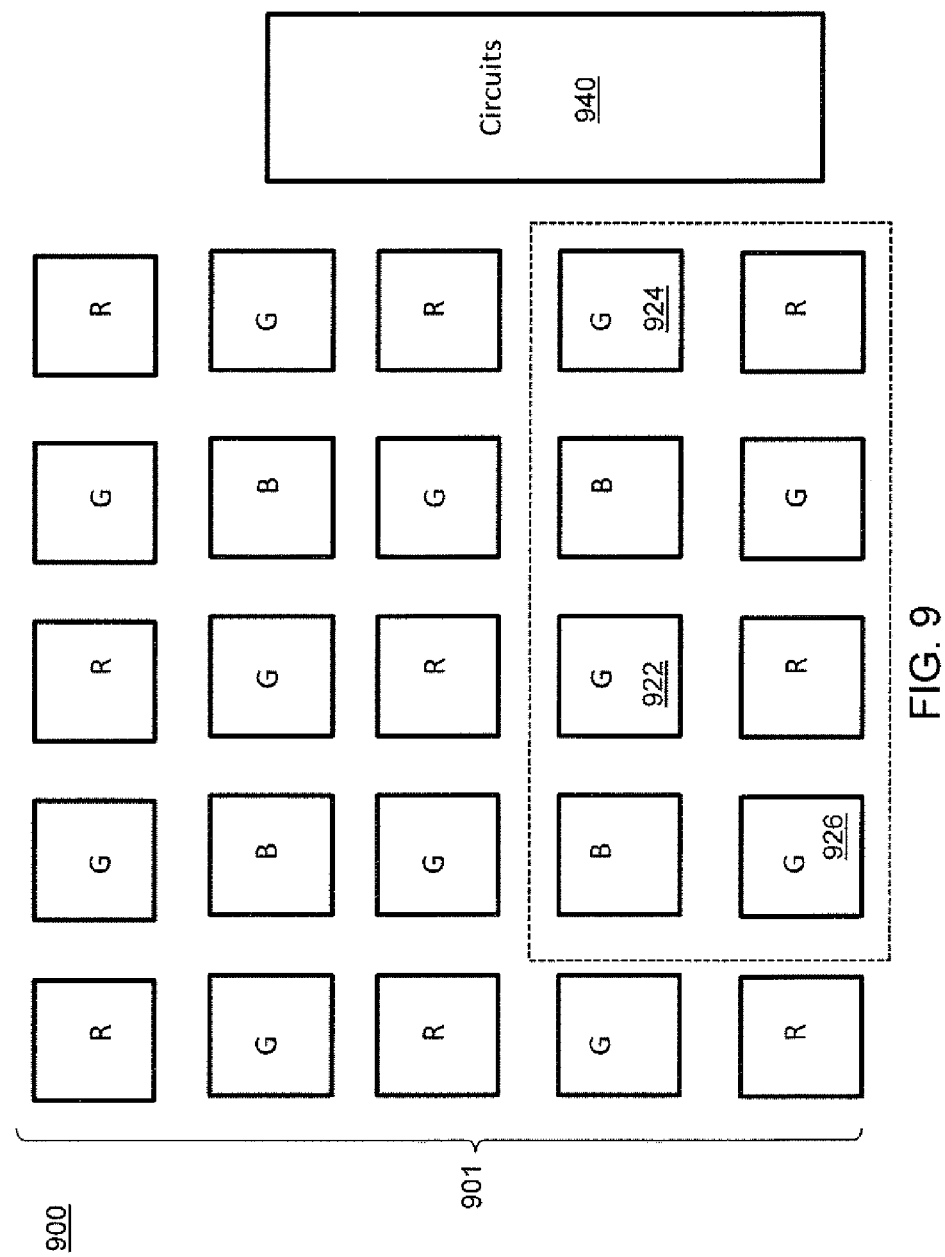
FIG. 9 illustrates a top view of an alternative camera sensor.

FIG. 9 illustrates a camera chip 900 having a sensor array 901. The sensor array 901 may be covered by one of the red, green and blue color filters marked as 'R', 'G', 'B' in FIG. 9. Three of the photo-detectors 922, 924, 926 in the sensor array 901 covered by similar color filter may be configured to be arranged and configured to operate in a manner substantially similar to the first, second and third photo-detectors 722, 724, 728 shown in FIG. 7. The first, second and third photo-detectors 922, 924, 926 may be located at a center portion of the sensor array 901. The photo-detectors 922, 924, 926 may be located in a center portion of the array 901 so that coupling photo-currents (not shown) from other neighboring sensors 901 detected in the respective photo-detectors 922, 924, 926 are substantially similar. The circuits 940 connected to the sensor array 901 may be configured to operate in a manner substantially similar to the circuit 740 illustrated in FIG. 7.

Figure 10:
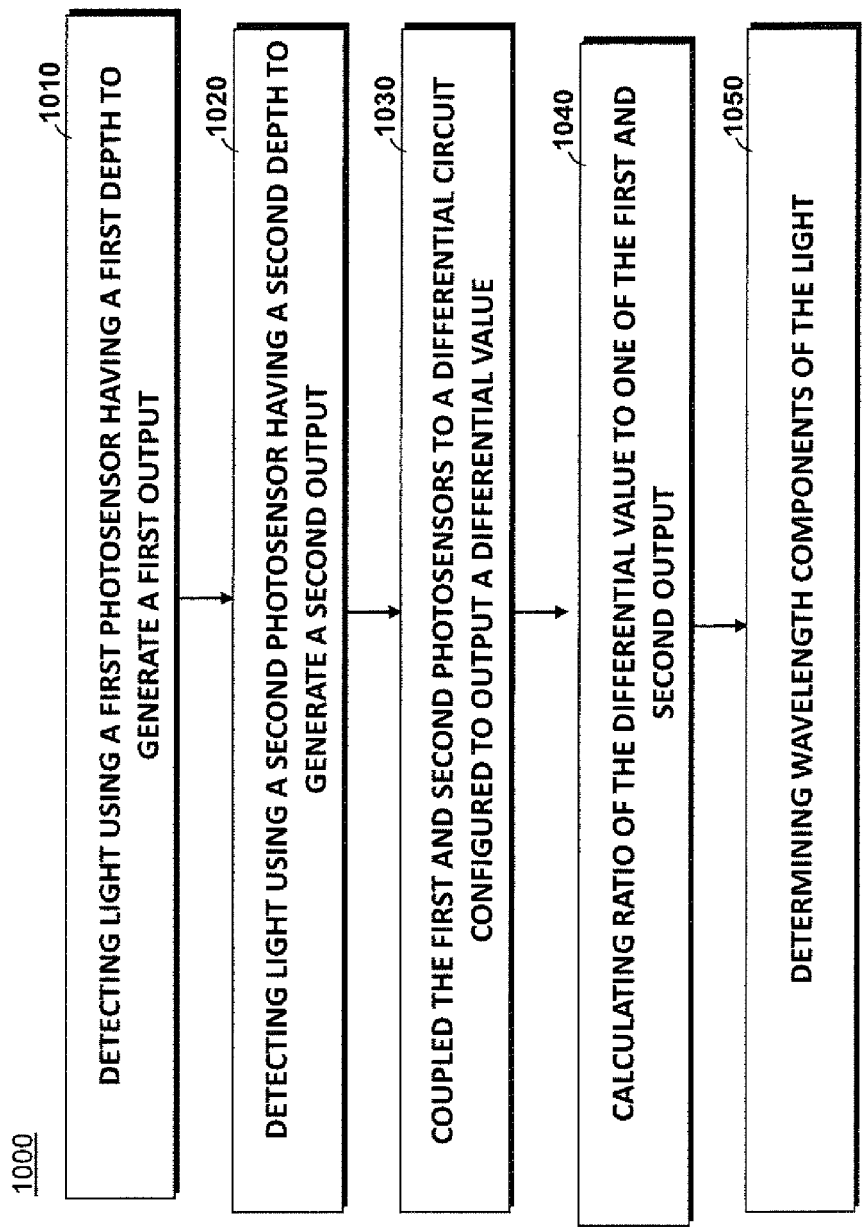
FIG. 10 illustrates a method of detecting a wavelength of ambient light.

FIG. 10 illustrates a method 1000 of detecting a wavelength of ambient light. The method 1000 starts with step 1010 in which a first output is generated by detecting ambient light using a first photo-sensor having a first depth. In step 1020, a second output is generated by detecting ambient light using a second photo-sensor having a second depth. Next, in step 1030, the first and second outputs from the first and second photo-sensors may be coupled to a differential circuit so that a differential output value may be obtained. Subsequently, in step 1040, a ratio of the differential output value to one of the first and second outputs may be computed. Finally, in step 1050, the wavelength of ambient light may be determined by using the ratio computed in step 1040.

Different aspects, embodiments or implementations may, but need not, yield one or more of the following advantages. For example, the first and second photo-detectors 122, 124 may be configured to detect dim ambient light by adding the signals detected by both first and second photo-detectors 122, 124 but when the ambient light is strong enough, differential value may be computed to determine the wavelength of the light source, which in turns contributes towards identifying the light source (not shown) producing the incident light 190. Unlike other solutions that use a shielded photo-detector, the ambient light sensor 100 with fully exposed photo-detectors 122, 124 may be advantageous due to the higher sensitivity towards light as unshielded photo-detectors 122, 124 may be more energy efficient. In addition, many different aspects presented in various embodiments may be advantageous to ensure that the photo-detectors behave in the similar manners to achieve accuracy in the wavelength detection.

Although specific embodiments of the invention have been described and illustrated herein above, the invention should not be limited to any specific forms, combinations or arrangements of parts so described and illustrated. A feature illustrated in one embodiment may be combined into another embodiment. For example, the third photo-detectors 728 used to increase the difference between the first and second photo-detectors 722, 724 may be applied to all other embodiments without departing from the spirit of the invention. Likewise, although photodiodes were discussed, the embodiments are applicable to other photo-detectors such as a photo-transistor. The scope of the invention is to be defined by the claims appended hereto and their equivalents.

What is claimed is:

1. An ambient light sensor for sensing incident light, comprising:
   a first photo-detector configured to be exposed to the incident light;
   a second photo-detector configured to be exposed to the incident light and formed proximate to the first photo-detector such that the first and second photo-detectors receive substantially similar portions of the incident light;
   a third photo-detector configured to be exposed to the incident light and formed proximate to at least one of the first photo-detector and second photo-detector;
   a circuit coupled to the first and second photo-detectors configured to determine an indication of spectral content of the incident light; and
   one or more switching circuits that selectively couple the first photo-detector to one of the second photo-detector and third photo-detector;
   wherein the first and second photo-detectors have first and second depths respectively; and
   wherein the first depth is relatively deeper than the second depth such that the first and second photo-detectors respond differently to a specific predetermined wavelength of the incident light.

2. The ambient light sensor as recited in claim 1, wherein the first and second photo-detectors are spaced apart by a distance of approximately less than 25 um and wherein the one or more switching circuits selectively couple the circuit to either the first and second photo-detectors or to the first and third photo-detectors.

3. The ambient light sensor as recited in claim 1, wherein:
   the first photo-detector is configured to generate a first photo-current;
   the second photo-detector is configured to generate a second photo-current;
   the circuit is configured to generate an output indicative of a ratio of the difference between the first and second photo-currents to one of the first and second photo-currents; and
   the ratio provides the indication of the spectral content of the light.

4. The ambient light sensor as recited in claim 1, wherein the specific predetermined wavelength is within region of infra-red light.

5. An optical device for sensing incident light, comprising:
   a first photo-detector configured to be exposed to the light and configured to generate therein a first photo-current in response to the light;
   a second photo-detector configured to be exposed to the light and configured to generate therein a second photo-current in response to the light;
   a circuit electrically coupled to the first and second photo-detectors configured to determine an indication of spectral content of the light;
   wherein the first photo-current comprises a first photo-signal from the first photo-detector, and a first cross-coupling photo-signal from the second photo-detector;
   wherein the second photo-current comprises a second photo-signal from the second photo-detector and a second cross-coupling photo-signal from the first photo-detector; and
   wherein the first photo-detector has a first depth and the second photo-detector has a second depth different from the first depth such that the first and second cross-coupling photo-signals respond substantially differently to portions of the light of a predetermined wavelength.

6. The optical device as recited in claim 5, wherein:
   the first photo-detector has a first width dimension and a first length dimension;
   the second photo-detector has a second width dimension and a second length dimension;

the first width dimension is substantially similar to the second width dimension; and the first length dimension is substantially similar to the second length dimension.

7. The optical device as recited in claim 5, wherein the first and second photo-detectors are covered by a substantially transparent material such that light transmitted through the substantially transparent material has less than approximately 5% light loss.

8. The optical device as recited in claim 5 further comprising a third photo-detector having a third depth, wherein the third photo-detector is formed proximate to at least one of the first and second photo-detectors.

9. The optical device as recited in claim 8, wherein the third photo-detector is electrically coupled to the circuit through a switching circuit configured to selectively couple two of the first, second and third photo-detectors to the circuit.

10. The optical device as recited in claim 8, wherein the first, second, and third photo-detectors are configured to be biased at a substantially similar voltage values.

11. The optical device as recited in claim 8, wherein the third photo-detector is configured to generate a third photo-current comprising a third photo-signal generated within the third photo-detector and a third coupling photo-signal generated in at least one of the first and second photo-detectors.

12. The optical device as recited in claim 5 is a camera sensor that forms a portion of a camera.

13. The optical device as recited in claim 5 is an ambient light sensor that forms a portion of a mobile device.

14. The optical device as recited in claim 5 further comprising a surrounding area outside the first and second photo-detectors, wherein the surrounding area is shielded from light.

15. The optical device as recited in claim 5, wherein:

the first photo-detector has a first incident surface for receiving the incident light;

the second photo-detector has a second incident surface for receiving the incident light; and the first and second incident surfaces are substantially similar in size and shape.

16. An optical sensor for sensing ambient light, comprising:

a first photo-detector, the first photo-detector having a first depth;

a second photo-detector, the second photo-detector having a second depth relatively deeper than the first depth such that the first and second photo-detectors respond differently to a specific predetermined wavelength;

a circuit coupled to the first and second photo-detectors for determining an indication of spectral content of the ambient light; and a third photo-detector proximate to at least one of the first and second photo-detectors, wherein the first, second and third photo-detectors are configured to be exposed to the ambient light and located in close proximity such that a coupling current is detected in at least one of the first and second photo-detectors in response to light received in the third photo-detector.

17. The optical sensor of claim 16, wherein the coupling current is detected in the first photo-detector, and a further coupling current is detected in the second photo-detector in response to light received in the third photo-detector.

18. The optical sensor of claim 17, wherein the third photo-detector is located closer to the first photo-detector compared to the second photo-detector such that the coupling current from the third photo-detector detected in the first photo-detector is relatively larger than the further coupling current from the third photo-detector detected in the second photo-detector.

19. The optical sensor of claim 16, wherein the third photo-detector has a third depth substantially similar to one of the first and second depths.

20. The optical sensor of claim 16, wherein the first, second and third photo-detectors are a portion of a sensor array of a camera chip, and wherein the first, second and third photo-detectors are located a center portion of the sensor array.

* * * * *